US012666245B2

(12) United States Patent
Chen et al.

(10) Patent No.: US 12,666,245 B2
(45) Date of Patent: Jun. 23, 2026

(54) METHOD AND APPARATUS FOR SESSION RESTORATION

(71) Applicant: Telefonaktiebolaget LM Ericsson (publ), Stockholm (SE)

(72) Inventors: Ping Chen, Shanghai (CN); Jingrui Tao, Guangzhou (CN); Haiming Cheng, Shanghai (CN); Qiang Liu, Shanghai (CN); Tianmei Liang, Shanghai (CN); Emiliano Merino Vazquez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 315 days.

(21) Appl. No.: 18/293,577

(22) PCT Filed: Aug. 8, 2022

(86) PCT No.: PCT/CN2022/110840
§ 371 (c)(1),
(2) Date: Jan. 30, 2024

(87) PCT Pub. No.: WO2023/016400
PCT Pub. Date: Feb. 16, 2023

(65) Prior Publication Data
US 2024/0349030 A1　　Oct. 17, 2024

(30) Foreign Application Priority Data
Aug. 9, 2021　(WO) ................ PCT/CN2021/111578

(51) Int. Cl.
*H04W 8/18* (2009.01)
*H04L 12/14* (2024.01)
(Continued)

(52) U.S. Cl.
CPC ........... *H04W 8/18* (2013.01); *H04L 12/1407* (2013.01); *H04L 47/805* (2013.01); *H04L 69/167* (2013.01)

(58) Field of Classification Search
CPC .... H04W 8/18; H04L 12/1407; H04L 47/805; H04L 69/167
See application file for complete search history.

(56) References Cited

U.S. PATENT DOCUMENTS 11,910,287 B2 * 2/2024 Xu ........................... H04W 4/60
12,185,232 B2 * 12/2024 Ianev .................... H04W 48/18
(Continued)

FOREIGN PATENT DOCUMENTS

CN　　107431641 A　　12/2017
CN　　112740623 A　　4/2021
(Continued)

OTHER PUBLICATIONS

First Office Action for Japanese Patent Application No. 2024-506264 dated Feb. 3, 2025, 3 pages.
(Continued)

*Primary Examiner* — Brian J. Gillis
(74) *Attorney, Agent, or Firm* — Sage Patent Group

(57) ABSTRACT

Embodiments of the present disclosure provide method and apparatus for session restoration. A method performed by a network node includes receiving a first request for setting up a session with required quality of service (QOS) from an application node. The method further includes sending a first response including error information and subscription information of an existing session including a subscription identifier to the application node.

20 Claims, 12 Drawing Sheets

(51) Int. Cl.
  *H04L 47/80* (2022.01)
  *H04L 69/167* (2022.01)

(56) References Cited

U.S. PATENT DOCUMENTS

| | | | |
|---|---|---|---|
| 12,207,344 B2 * | 1/2025 | Wu ........................ | H04W 76/19 |
| 2016/0269251 A1 | 9/2016 | Hassan et al. | |
| 2016/0344533 A1 | 11/2016 | Wei et al. | |
| 2021/0112514 A1 | 4/2021 | Long | |
| 2021/0274387 A1 | 9/2021 | Kousaridas et al. | |
| 2023/0269575 A1 * | 8/2023 | Lee ........................ | H04L 67/141 |
| | | | 709/224 |

FOREIGN PATENT DOCUMENTS

| | | | |
|---|---|---|---|
| WO | 2020224791 A1 | 11/2020 | |
| WO | 2021083645 A1 | 5/2021 | |

OTHER PUBLICATIONS

Ericsson, Huawei, "Updates GET Query in AsSessionWithQoS API," C3-215428, (Revision of C3-215138), 3GPP TSG-CT WG3 Meeting #118e, E-Meeting, Oct. 11-15, 2021, 13 pages.

International Search Report and Written Opinion of the International Searching Authority, PCT/CN2022/110840, mailed Nov. 9, 2022, 10 pages.

Apple, "Pseudo-CR on Specification of the Session with QoS API," 3GPP TSG-SA WG6 Meeting #38-e, S6-200980 (revision of S6-20xxxx), e-meeting, Jul. 20-31, 2020, 9 pages.

Huawai et al., "PCF selection for the PDU sessions having the same UE id, DNN and S-NSSAI combination," 3GPP TSG-SA WG2 Meeting #133, S2-1905708 (revision of S2-1903002), May 13-17, Reno, Nevada, USA, 24 pages.

3GPP TS 23.503 V17.1.0 (Jun. 2021); 3rd Generation Partnership Project; Technical Specification Group Services and System Aspects; Policy and charging control framework for the 5G System (5GS); Stage 2 (Release 17), 137 pages.

3GPP TS 29.122 V17.2.0 )Jun. 2021); 3rd Generation Partnership Project; Technical Specification Group Cores Network and Terminals; T8 reference point for Northbound APIs; (Release 17), 429 pages.

3GPP TS 23.682 V17.0.0 (Jun. 2021); 3rd Generation Partnership Project; Technical Specification Group Services and System Aspects; Architecture enhancements to facilitate communications with packet data networks and applications (Release 17), 137 pages.

3GPP TS 23.502 V17.0.0 (Mar. 2021); 3rd Generation Partnership Project; Technical Specification Group Services and System Aspects; Procedures for the 5G System (5GS); Stage 2 (Release 17), 646 pages.

3GPP TS 23.501 V17.0.0 (Mar. 2021); 3rd Generation Partnership Project; Technical Specification Group Services and System Aspects; System architecture for the 5G System (5GS) Stage 2 (Release 17), 489 pages.

3GPP TS 23.203 V17.1.0 (Jun. 2021); 3rd Generation Partnership Project; Technical Specification Group Services and System Aspects; Policy and charging control architecture (Release 17), 267 pages.

* cited by examiner

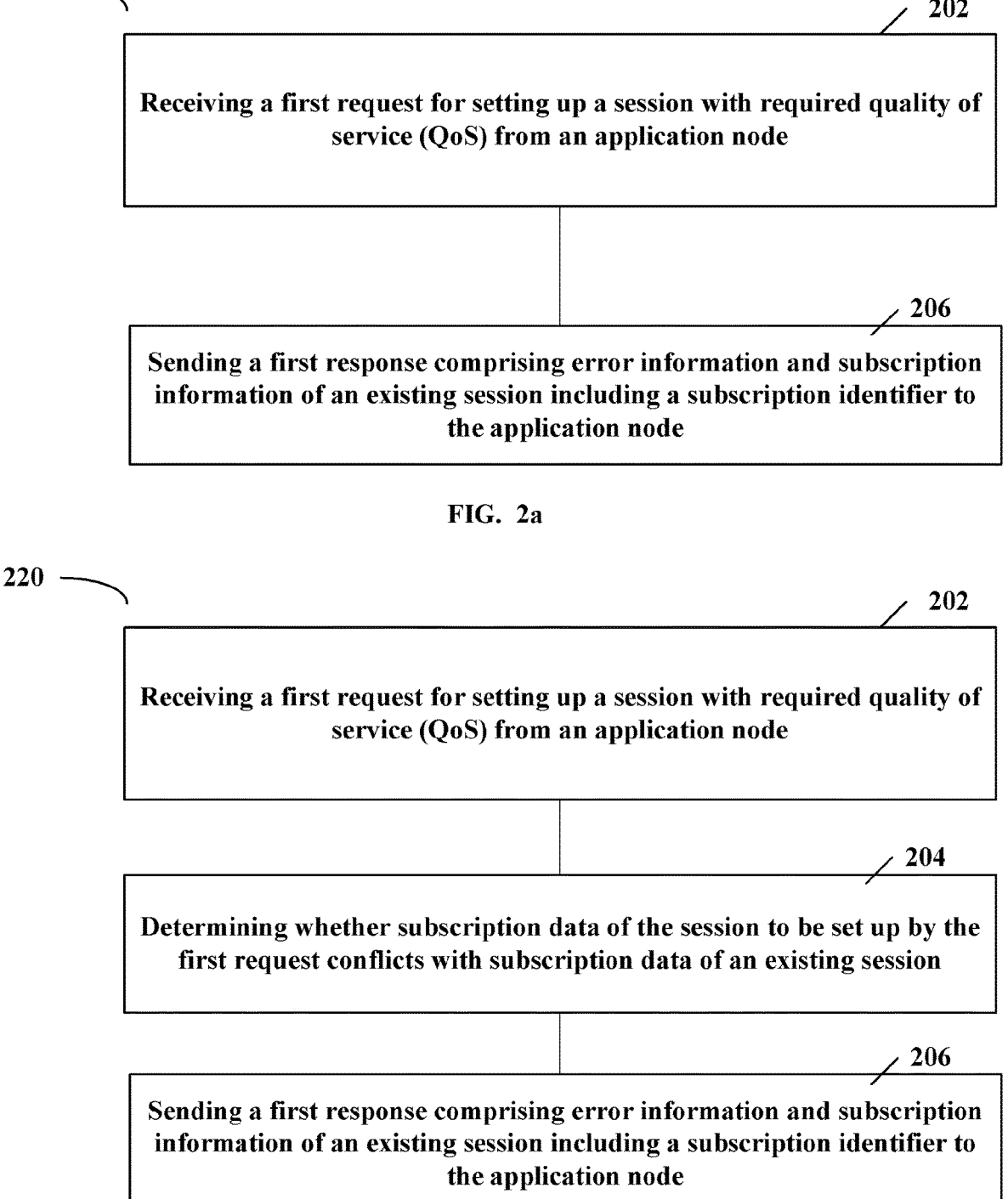

200

202

Receiving a first request for setting up a session with required quality of service (QoS) from an application node

206

Sending a first response comprising error information and subscription information of an existing session including a subscription identifier to the application node

Receiving a first request for setting up a session with required quality of service (QoS) from an application node

204

Determining whether subscription data of the session to be set up by the first request conflicts with subscription data of an existing session

206

Sending a first response comprising error information and subscription information of an existing session including a subscription identifier to the application node

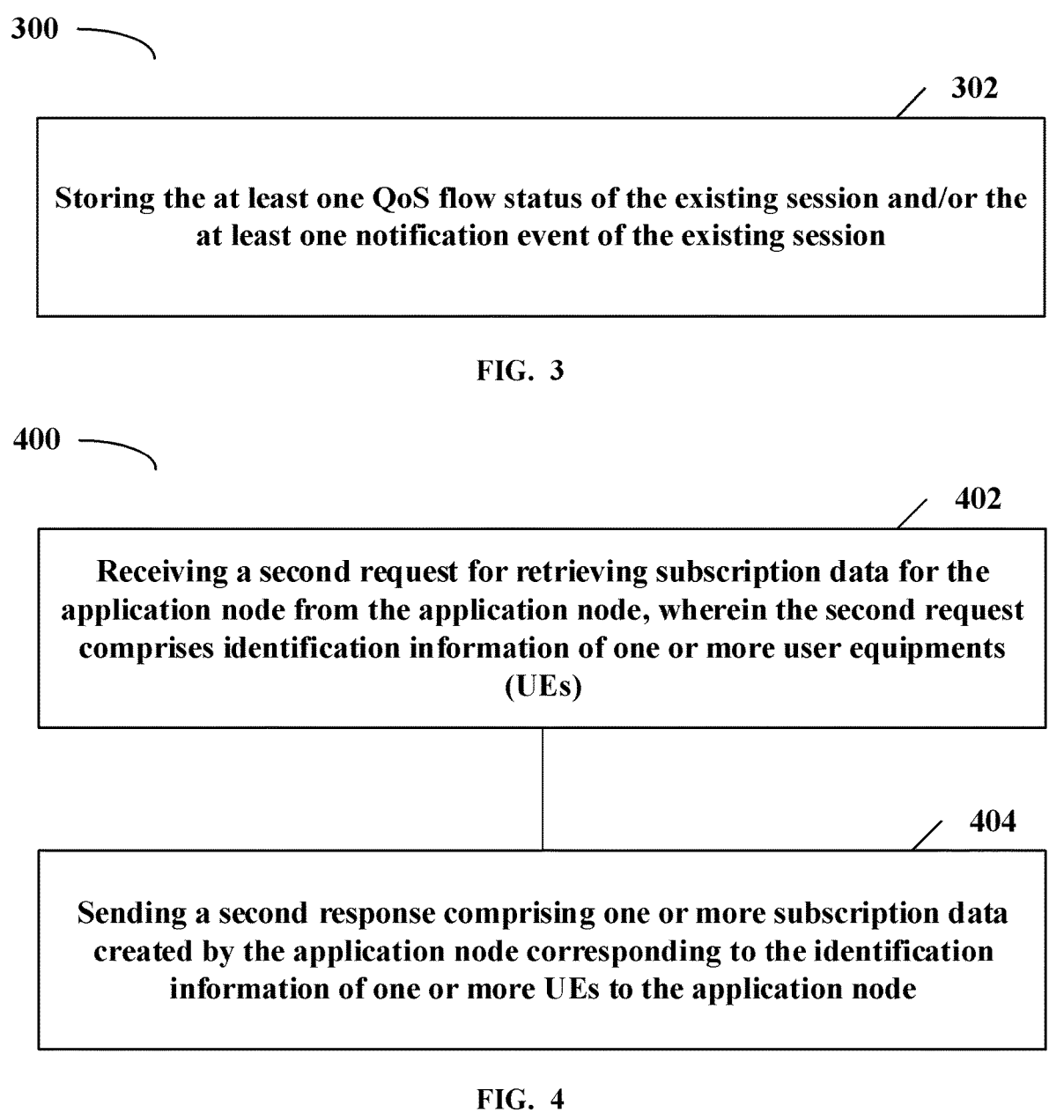

```
Storing the at least one QoS flow status of the existing session and/or the
        at least one notification event of the existing session
```

```
    Receiving a second request for retrieving subscription data for the
application node from the application node, wherein the second request
 comprises identification information of one or more user equipments
                                  (UEs)
```

/ 404

```
Sending a second response comprising one or more subscription data
  created by the application node corresponding to the identification
      information of one or more UEs to the application node
```

FIG. 4

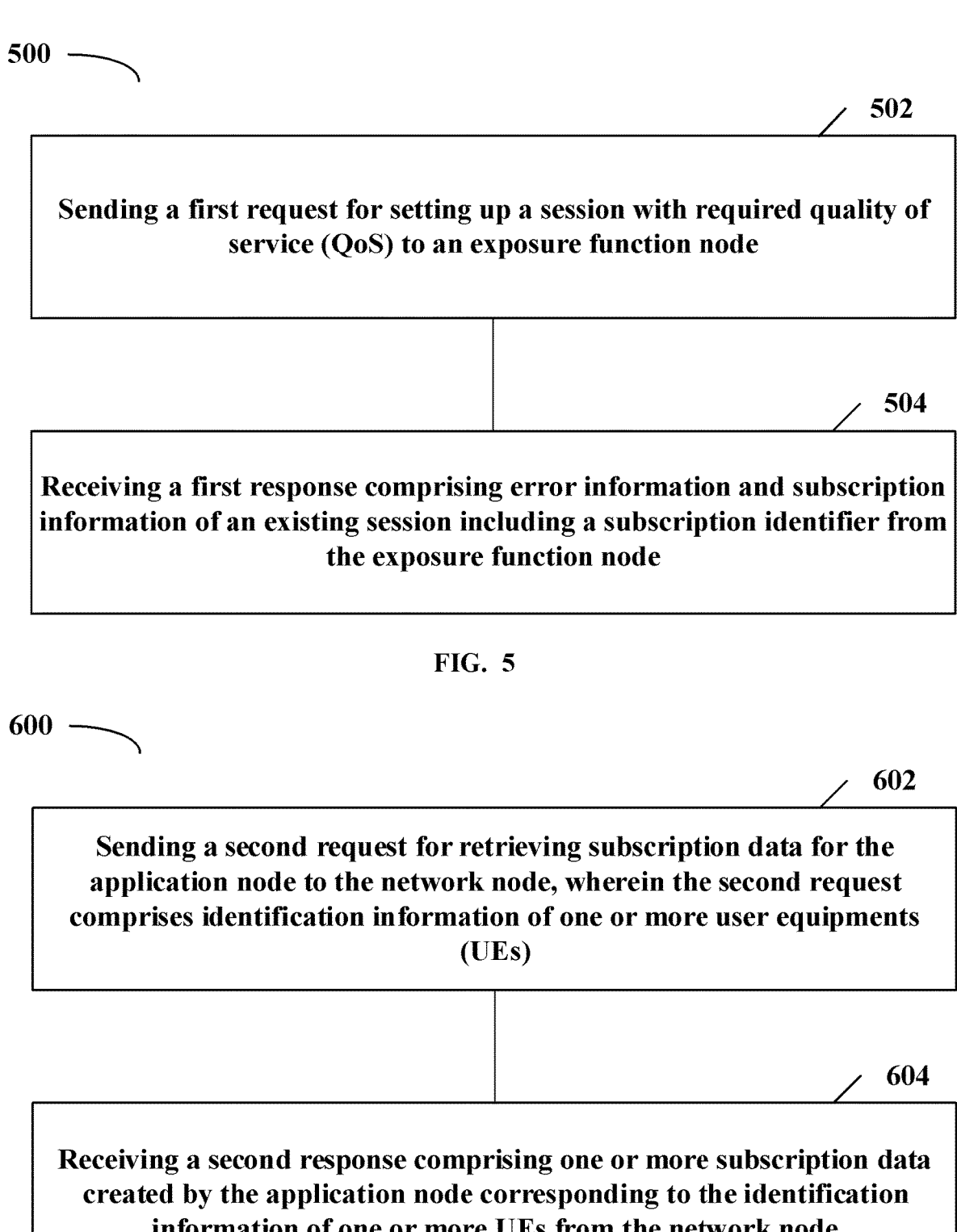

500

502

Sending a first request for setting up a session with required quality of service (QoS) to an exposure function node

504

Receiving a first response comprising error information and subscription information of an existing session including a subscription identifier from the exposure function node

Sending a second request for retrieving subscription data for the application node to the network node, wherein the second request comprises identification information of one or more user equipments (UEs)

604

Receiving a second response comprising one or more subscription data created by the application node corresponding to the identification information of one or more UEs from the network node

FIG. 6

METHOD AND APPARATUS FOR SESSION RESTORATION

CROSS REFERENCE TO RELATED APPLICATIONS

This application is a 35 U.S.C. § 371 national stage application of PCT International Application No. PCT/CN2022/110840 filed on Aug. 8, 2022, which in turn claims foreign priority to International Patent Application No. PCT/CN2021/111578, filed on Aug. 9, 2021, the disclosures and content of which are incorporated by reference herein in their entirety.

TECHNICAL FIELD

The non-limiting and exemplary embodiments of the present disclosure generally relate to the technical field of communications, and specifically to methods and apparatuses for session restoration.

BACKGROUND

This section introduces aspects that may facilitate a better understanding of the disclosure. Accordingly, the statements of this section are to be read in this light and are not to be understood as admissions about what is in the prior art or what is not in the prior art.

In communication networks for example LTE (Long Term Evolution) and NR (new radio) as defined by 3rd Generation Partnership Project (3GPP), an application node such as 3rd party SCS/AS/AF (services capability server/application server/application function) may request that a data session to a UE (user equipment) that is served by the application node is set up with a specific QoS (quality of service) (e.g. low latency or jitter, etc.) and priority handling. This functionality may be exposed via an exposure node such as Service Capability Exposure Function (SCEF) or Network Exposure Function (NEF) towards the application node such as SCS/AS/AF.

Clause 5.11 of 3GPP TS 23.682 V17.0.0, the disclosure of which is incorporated by reference herein in its entirety, describes a procedure of setting up an AS session with required QoS. Clause 4.15.6.6 of 3GPP TS 23.502 V17.0.0, the disclosure of which is incorporated by reference herein in its entirety, describes a procedure of setting up an AF session with required QoS procedure.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Existing procedures of setting up an SCS/AS/AF session with required QoS have some problems. For example, SCS/AF/AS may be experienced with loss of the ongoing QoS sessions subscription data, due to some unexpected problems e.g. SCS/AF/AS restart or reload. SCS/AF/AS may be fast recovered but cannot recover the complete QoS session subscription data and still miss the ongoing QoS session subscription Id. SCS/AF/AS restoration cannot be effectively supported. Duplicated session subscription data may result in duplicated resources consumption in network node (such as NEF and other related NF). HTTP GET method for getting session subscription data has risk that heavy signaling load impacts to network node such as NEF.

For example, when SCS/AF/AS session with required QoS is requested by an AF/AS via NEF/SCEF->PCF/PCRF (Policy Control Function/Policy and Charging Rules Function) to request a certain QoS to be applied in the network, proper configuration and resources are created in various network nodes such as NEF/SCEF, PCF/PCRF, SMF (Session Management Function), UPF (User plane Function), Packet Data Network Gateway (PGW), RAN (radio access network) and UE so that the user can enjoy a better QoS (e.g. better bit rate or bandwidth, etc.). These resources are kept in related network elements and the AF/AS, so that they can be deleted when they are not required (in this case, when they are not used by the UE).

For example, the QoS for a given IP (Internet protocol) flow (e.g. from the UE IP address towards the AF IP address and vice versa) or an application (identified by application identifier) is applied based on a QoS reference for the flow associated to the UE IP Address.

Loss of QoS sessions subscription data in AF/AS may be experienced due to some unexpected problems e.g. AF/AS restart or reload. Some customers have experienced their AFs/ASs (or AFs/ASs from another party/vendor) losing the ongoing sessions, for example due to a restart or reload of the AFs/ASs. When an AF/AS is recovered/reloaded, if the UE is still enjoying the service (e.g., if the IP flow or application flow is still active), the AF/AS tries to establish a new QoS session towards NEF (via Hypertext Transfer Protocol (HTTP) POST) apart from the existing QoS session. The information related to the QoS session will be sent to PCF/PCRF and onto SMF/UPF/PGW, given that a HTTP POST is by definition non-idempotent (i.e. if x HTTP POST are sent, x resources are created in the network). In short, the AF/AS might be creating new resources in the network when the resources are already created. In practice, this results in UPF/PGW may store multiple identical application flow or IP flow packet detection filter rules to be matched when an IP packet is received, but only one of them is matched, since the packet detection matching stops when the packet is matched with an application flow or IP flow. This creates a lot of duplicated resources in network nodes such as NEF, PCF/PCRF, SMF, UPF, PGW. In addition, it also causes a non-deterministic behavior of the network, since the packet matching in UPF/PGW is done in order of precedence, so it might well differ depending on the PCF/PCRF/SMF/UPF/PGW vendor. Therefore if the application node such as AF/AS establishes a new QoS session with the partial or complete same subscription data towards the network node such as NEF/SCEF after the application node recovery, the conflicted new session creation request needs to be identified and handled effectively.

3GPP TS 29.122 V17.2.0, the disclosure of which is incorporated by reference herein in its entirety, describes HTTP GET method which allows to read all active subscriptions for a given SCS/AS. The SCS/AS shall initiate the HTTP GET request message and the NEF/SCEF shall respond to the message. However HTTP GET method is risky of heavy signaling load impacts if the AF/AS only needs to retrieve QoS session subscription data of one or more specific UEs rather than all active subscriptions for a given SCS/AS. For example, Get all subscription is risky of signaling overload impacts. GET method to retrieve active session subscriptions per SCS/AS Id or AF Id only defines GETALL which is risky of heavy signaling load impacts. If the AF only needs to retrieve specific UE(s) QOS sessions subscription data without knowledge of each subscription Id, GETALL also wastes both NEF and AF extra subscription data processing cost. Therefore the QoS session subscription retrieval of one or more specific UEs need to be effectively supported.

Blinding new subscription request is risky of conflict and IoT issues. If the AF/AS establish new QoS sessions subscription request towards the NEF/SCEF upon AF/AS fast recovery and traffic from UE, the blind new subscription request without knowledge of whether ongoing QoS session existing or not in the NEF, is risky of duplicated session subscription result in duplicated resources consumption in NEF and other related NFs inside EPC/5GC (Evolved Packet Core/5G core network), and/or arousing interworking compatibility issues upon no clear handling definition in current specification.

To overcome or mitigate at least one of above mentioned problems or other problems, the embodiments of the present disclosure propose an improved solution for session restoration.

In a first aspect of the disclosure, there is provided a method performed by a network node. The method comprises receiving a first request for setting up a session with required quality of service (QOS) from an application node. The method further comprises sending a first response comprising error information and subscription information of an existing session including a subscription identifier to the application node.

In an embodiment, the method further comprises determining whether subscription data of the session to be set up by the first request conflicts with subscription data of an existing session. The sending is performed when the subscription data of the session to be set up by the first request conflicts with the subscription data of the existing session.

In an embodiment, the determining is performed when the first request comprises information indicating at least one of checking whether subscription data of the session to be set up by the first request conflicts with subscription data of an existing session, application node subscription checking is requested, or potential conflict with an existing session.

In an embodiment, the error information comprises error status code and/or other error information.

In an embodiment, the subscription information of the existing session comprises a link to a resource "Individual Application Session with Required QoS Subscription" containing an existing subscription identifier.

In an embodiment, the subscription information of the existing session further comprises existing subscription data of the existing session.

In an embodiment, the first response further comprises at least one of at least one QoS flow status of the existing session or at least one notification event of the existing session.

In an embodiment, a QoS flow status comprises at least one of active or inactive.

In an embodiment, the method further comprises storing the at least one QoS flow status of the existing session and/or the at least one notification event of the existing session.

In an embodiment, storing the at least one QoS flow status of the existing session and/or the at least one notification event of the existing session comprises storing the at least one QoS flow status of the existing session and/or the at least one notification event of the existing session when the application node supports session subscription check.

In an embodiment, the first request comprises information indicating a support of session subscription check and the first response further comprises information indicating a support of session subscription check.

In an embodiment, the first request is an HTTP POST request and the first response is an HTTP POST response.

In an embodiment, the first request is received from the application node after the application node is restarted or reloaded.

In an embodiment, the network node comprises at least one of an exposure function node or a policy control node.

In an embodiment, the policy control node comprises at least one of Policy Control Function (PCF) or Policy and Charging Rules Function (PCRF).

In an embodiment, the exposure function node comprises at least one of Service Capability Exposure Function (SCEF), Network Exposure Function (NEF), or SCEF combined with NEF.

In an embodiment, the application node comprises at least one of application function, application server, or services capability server.

In an embodiment, the method further comprises receiving from the application node a second request for retrieving subscription data for the application node. The second request comprises identification information of one or more user equipments (UEs). The method further comprises sending a second response comprising one or more subscription data created by the application node corresponding to the identification information of one or more UEs to the application node.

In an embodiment, identification information of a UE comprises at least one of an Internet protocol version 4 address of the UE, an Internet protocol domain, an identifier of the UE, a MAC address of the UE, or an Internet protocol version 6 address of the UE.

In an embodiment, the second response further comprises at least one of at least one QoS flow status corresponding to the subscription data, or at least one notification event corresponding to the subscription data.

In an embodiment, the second request is an HTTP GET request and the second response is an HTTP GET response.

In an embodiment, the second request is triggered for recovery.

In an embodiment, the second response comprises queried active subscriptions for the application node.

In a second aspect of the disclosure, there is provided a method performed by a network node. The method comprises receiving from an application node a second request for retrieving subscription data for the application node. The second request comprises identification information of one or more user equipments (UEs). The method further comprises sending a second response comprising one or more subscription data created by the application node corresponding to the identification information of one or more UEs to the application node.

In a third aspect of the disclosure, there is provided a method performed by an application node. The method comprises sending a first request for setting up a session with required quality of service (QOS) to an exposure function node. The method further comprises receiving a first response comprising error information and subscription information of an existing session including a subscription identifier from the exposure function node.

In an embodiment, the receiving is performed when subscription data of the session to be set up by the first request conflicts with the subscription data of the existing session.

In an embodiment, the method further comprises sending a second request for retrieving subscription data for the application node to the network node. The second request comprises identification information of one or more user equipments (UEs). The method further comprises receiving a second response comprising one or more subscription data created by the application node corresponding to the identification information of one or more UEs from the network node.

In a fourth aspect of the disclosure, there is provided a method performed by an application node. The method comprises sending a second request for retrieving subscription data for the application node to a network node. The second request comprises identification information of one or more user equipments (UEs). The method further comprises receiving a second response comprising one or more subscription data created by the application node corresponding to the identification information of one or more UEs from the network node.

In a fifth aspect of the disclosure, there is provided a network node. The network node comprises a processor and a memory coupled to the processor. Said memory contains instructions executable by said processor. Said network node is operative to receive a first request for setting up a session with required quality of service (QOS) from an application node. Said network node is further operative to send a first response comprising error information and subscription information of the existing session including a subscription identifier to the application node.

In an embodiment, said network node is further operative to check whether subscription data of the session to be set up by the first request conflicts with subscription data of an existing session.

In an embodiment, said network node is further operative to store the at least one QoS flow status of the existing session and/or the at least one notification event of the existing session.

In an embodiment, said network node is further operative to receive a second request for retrieving subscription data for the application node from the application node. The second request comprises identification information of one or more user equipments (UEs)

In an embodiment, said network node is further operative to send a second response comprising one or more subscription data created by the application node corresponding to the identification information of one or more UEs to the application node.

In a sixth aspect of the disclosure, there is provided a network node. The network node comprises a processor and a memory coupled to the processor. Said memory contains instructions executable by said processor. Said network node is operative to receive a second request for retrieving subscription data for the application node from an application node. The second request comprises identification information of one or more user equipments (UEs). Said network node is further operative to send a second response comprising one or more subscription data created by the application node corresponding to the identification information of one or more UEs to the application node.

In a seventh aspect of the disclosure, there is provided an application node. The application node comprises a processor and a memory coupled to the processor. Said memory contains instructions executable by said processor. Said application node is operative to send a first request for setting up a session with required quality of service (QOS) to an exposure function node. Said application node is further operative to receive a first response comprising error information and subscription information of the existing session including a subscription identifier from the exposure function node.

In an embodiment, said application node is further operative to send a second request for retrieving subscription data for the application node to the network node. The second request comprises identification information of one or more user equipments (UEs).

In an embodiment, said application node is further operative to receive a second response comprising one or more subscription data created by the application node corresponding to the identification information of one or more UEs from the network node.

In an eighth aspect of the disclosure, there is provided an application node. The application node comprises a processor and a memory coupled to the processor. Said memory contains instructions executable by said processor. Said application node is operative to send a second request for retrieving subscription data for the application node to a network node. The second request comprises identification information of one or more user equipments (UEs). Said application node is further operative to receive a second response comprising one or more subscription data created by the application node corresponding to the identification information of one or more UEs from the network node.

In a ninth aspect of the disclosure, there is provided a network node. The network node comprises a first receiving module and a first sending module. The first receiving module may be configured to receive a first request for setting up a session with required quality of service (QOS) from an application node. The first sending module may be configured to send a first response comprising error information and subscription information of an existing session including a subscription identifier to the application node.

In an embodiment, the network node further comprises a determining module configured to determine whether subscription data of the session to be set up by the first request conflicts with subscription data of an existing session.

In an embodiment, the network node further comprises a storing module configured to store the at least one QoS flow status of the existing session and/or the at least one notification event of the existing session.

In an embodiment, the network node further comprises a second receiving module configured to receive a second request for retrieving subscription data for the application node from the application node, wherein the second request comprises identification information of one or more user equipments (UEs).

In an embodiment, the network node further comprises a second sending module configured to send a second response comprising one or more subscription data created by the application node corresponding to the identification information of one or more UEs to the application node.

In a tenth aspect of the disclosure, there is provided a network node. The network node comprises a second receiving module and a second sending module. The second receiving module is configured to receive a second request for retrieving subscription data for the application node from the application node, wherein the second request comprises identification information of one or more user equipments (UEs). The second sending module is configured to send a second response comprising one or more subscription data created by the application node corresponding to the identification information of one or more UEs to the application node.

In an eleventh aspect of the disclosure, there is provided an application node. The application node comprises a first sending module and a first receiving module. The first sending module is configured to send a first request for setting up a session with required quality of service (QOS)

to an exposure function node. The first receiving module is configured to receive a first response comprising error information and subscription information of an existing session including a subscription identifier from the exposure function node.

In an embodiment, the application node further comprises a second sending module configured to send a second request for retrieving subscription data for the application node to the network node. The second request comprises identification information of one or more user equipments (UEs).

In an embodiment, the application node further comprises a second receiving module configured to receive a second response comprising one or more subscription data created by the application node corresponding to the identification information of one or more UEs from the network node.

In a twelfth aspect of the disclosure, there is provided an application node. The application node comprises a second sending module and a second receiving module. The second sending module is configured to send a second request for retrieving subscription data for the application node to a network node, wherein the second request comprises identification information of one or more user equipments (UEs). The second receiving module is configured to receive a second response comprising one or more subscription data created by the application node corresponding to the identification information of one or more UEs from the network node.

In a thirteenth aspect of the disclosure, there is provided a computer program product comprising instructions which when executed by at least one processor, cause the at least one processor to perform the method according to any one of the first, second, third and fourth aspects.

In a fourteenth aspect of the disclosure, there is provided a computer-readable storage medium storing instructions which when executed by at least one processor, cause the at least one processor to perform the method according to any one of the first, second, third and fourth aspects.

Embodiments herein may provide many advantages, of which a non-exhaustive list of examples follows. In some embodiments herein, the proposed solution can protect the core network from creating duplicated resources by means of network node (such as NEF/SCEF/PCF/PCRF) implementing the conflict detection and providing accurate information to application node (such as AF/AS/SCS) so that they can resolve the conflict based on needs/requirements, hence making subscription information between the application node and the network node consistent after an application node failure. In some embodiments herein, the proposed solution can allow an application node to quickly resync/retrieve its own QOS sessions when a failure/loss of data happened in the application node upon unexpected problems like restart or reload. In some embodiments herein, the proposed solution can avoid extra resources occupation in the network node (such as NEF, PCF, SMF and UPF). In some embodiments herein, the proposed solution can minimize the signaling messages between the application node and the network node. In some embodiments herein, the proposed solution can shorten the AF QoS session recovery time upon avoiding some new QoS session creation request messages. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 2a shows a flowchart of a method according to an embodiment of the present disclosure;

FIG. 2b shows a flowchart of a method according to another embodiment of the present disclosure;

FIG. 3 shows a flowchart of a method according to another embodiment of the present disclosure;

FIG. 4 shows a flowchart of a method according to another embodiment of the present disclosure;

FIG. 5 shows a flowchart of a method according to another embodiment of the present disclosure;

FIG. 6 shows a flowchart of a method according to another embodiment of the present disclosure;

DETAILED DESCRIPTION

Figure 1A:
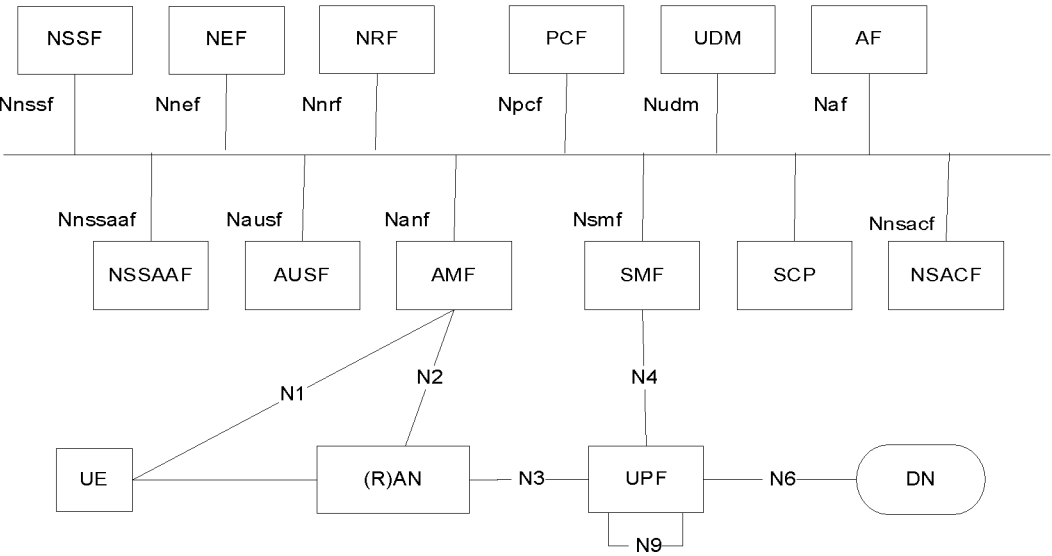
FIG. 1a schematically shows a high level architecture in the fifth generation network according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols may comprise the first generation (1G), 2G, 3G, 4G, 4.5G, 5G communication protocols, and/or any other protocols either currently known or to be developed in the future.

The term "network device" or "network node" refers to any suitable network function (NF) which can be implemented in a network function (physical or virtual) of a communication network. For example, the network function can be implemented either as a network element on a dedicated hardware, as a software instance running on a dedicated hardware, or as a virtualized function instantiated on an appropriate platform, e.g. on a cloud infrastructure. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), NSSF (Network Slice Selection Function), NSSAAF (Network Slice-Specific Authentication and Authorization Function), etc. For example, the 4G system (such as LTE) may include MME (Mobile Management Entity), HSS (home subscriber server), Policy and Charging Rules Function (PCRF), Packet Data Network Gateway (PGW), PGW control plane (PGW-C), Serving gateway (SGW), SGW control plane (SGW-C), E-UTRAN Node B (eNB), etc. In other embodiments, the network node may comprise different types of NFs for example depending on a specific network.

The term "terminal device" or "user equipment (UE)" refers to any end device that can access a communication network and receive services therefrom. By way of example and not limitation, the terminal device refers to a mobile terminal or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VOIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms.

These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" or "at least one of A or B" should be understood to mean "only A, only B, or both A and B." The phrase "A and/or B" should be understood to mean "only A, only B, or both A and B".

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Figure 1B:
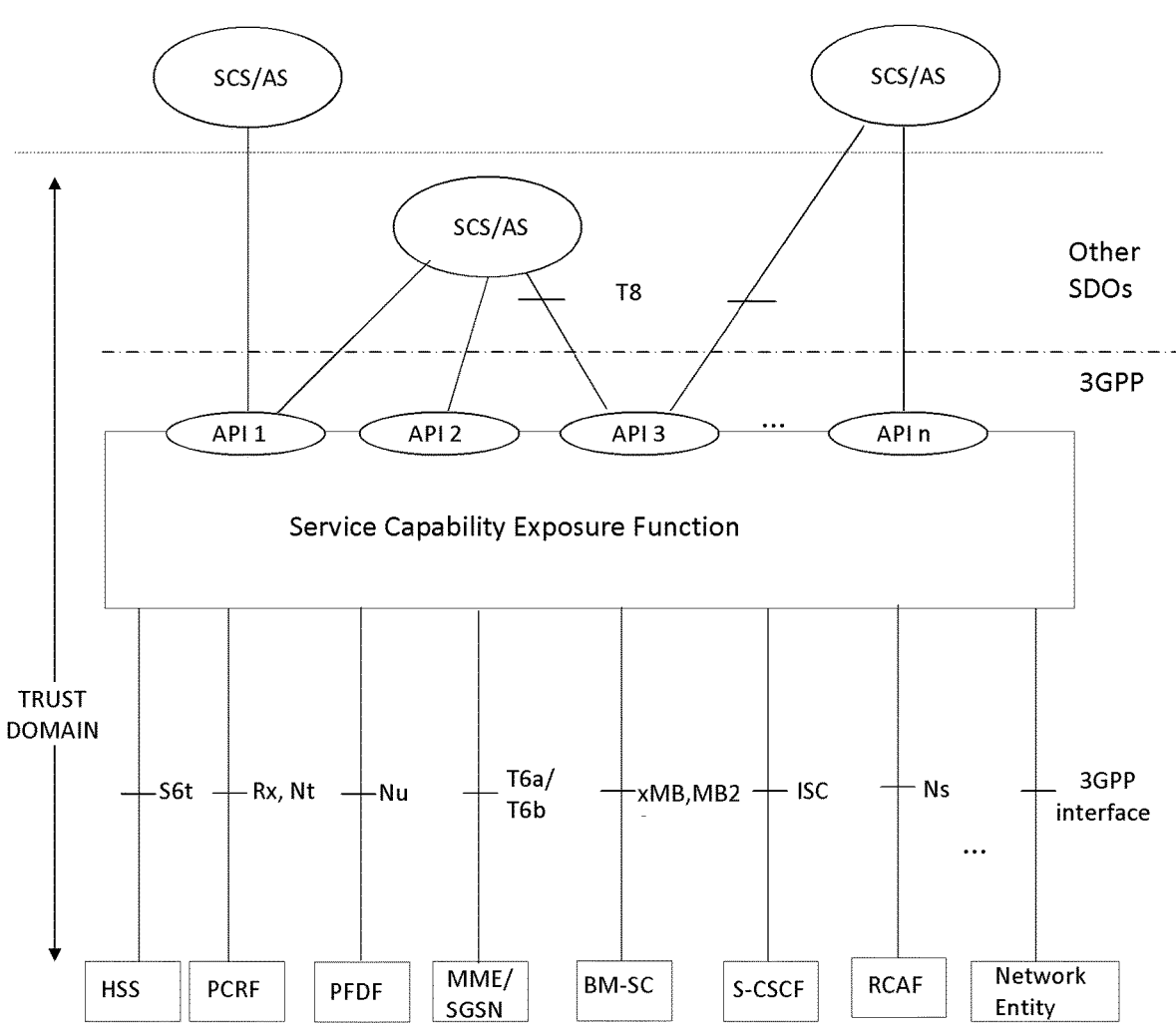
FIG. 1b schematically shows system architecture in a 4G network according to an embodiment of the present disclosure.

Although the subject matter described herein may be implemented in any appropriate type of system using any suitable components, the embodiments disclosed herein are described in relation to a communication system complied with the exemplary system architectures illustrated in FIGS. 1a-1b. For simplicity, the system architectures of FIGS. 1a-1b only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 1a schematically shows a high level architecture in the fifth generation network according to an embodiment of the present disclosure. For example, the fifth generation network may be 5GS. The architecture of FIG. 1a is same as FIG. 4.2.3-1 as described in 3GPP TS 23.501 V17.0.0, the disclosure of which is incorporated by reference herein in its entirety. The system architecture of FIG. 1a may comprise some exemplary elements such as AUSF, AMF, DN (data network), NEF, NRF, NSSF, PCF, SMF, UDM, UPF, AF, UE, (R)AN, SCP (Service Communication Proxy), NSSAAF (Network Slice-Specific Authentication and Authorization Function), NSACF (Network Slice Admission Control Function), etc.

In accordance with an exemplary embodiment, the UE can establish a signaling connection with the AMF over the reference point N1, as illustrated in FIG. 1a. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a protocol data unit (PDU) session to the DN (data network, e.g. an operator network or Internet) through the UPF over the reference point N6.

As further illustrated in FIG. 1a, the exemplary system architecture also contains the service-based interfaces such as Nnrf, Nnef, Nausf, Nudm, Npcf, Namf, Nnsacf and Nsmf exhibited by NFs such as the NRF, the NEF, the AUSF, the UDM, the PCF, the AMF, the NSACF and the SMF. In addition, FIG. 1a also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 1a may be responsible for functions such as session management, mobility management, authentication, security, etc. The AUSF, AMF, DN, NEF, NRF, NSSF, PCF, SMF, UDM, UPF, AF, UE, (R)AN, SCP, NSACF may include the functionality for example as defined in clause 6.2 of 3GPP TS 23.501 V17.0.0.

FIG. 1b schematically shows system architecture in a 4G network according to an embodiment of the present disclosure, which is the same as FIGS. 4.2-2 of 3GPP TS 23.682 V17.0.0, the disclosure of which is incorporated by reference herein in its entirety. The system architecture of FIG. 1b may comprise some exemplary elements such as Services Capability Server (SCS), Application Server (AS), SCEF (Service Capability Exposure Function), HSS (Home Subscriber Server), MME/SGSN (Mobile Management Entity/Serving GPRS (General Packet Radio Service) Support Node), PCRF (Policy and Charging Rules Function), S-CSCF (Serving CSCF (Call Server Control Function)), RCAF (Radio Congestion Awareness Function), PFDF (Packet Flow Description Function), BM-SC (Broadcast Multicast Service Centre), network entity, etc. The network elements and interfaces as shown in FIG. 1b may be same as the corresponding network elements and interfaces as described in 3GPP TS 23.682 V17.0.0.

FIG. 2a shows a flowchart of a method according to an embodiment of the present disclosure, which may be performed by an apparatus implemented in or at or as a network node or communicatively coupled to the network node. As such, the apparatus may provide means or modules for accomplishing various parts of the method 200 as well as means or modules for accomplishing other processes in conjunction with other components.

The network node may be a physical entity or a virtualized network function. For example, the network node may be any suitable network device or node or entity or function (physical or virtual) which can provide a function for setting up a session with required QoS.

In an embodiment, the network node may comprise at least one of an exposure node or a policy control node.

The exposure node may be a physical entity or a virtualized network function. For example, the exposure node may be any suitable network device or node or entity or function (physical or virtual) which can provide a means to securely expose the services and capabilities provided by the network interfaces. The exposure node may provide a means for the discovery of the exposed services and capabilities. The exposure node may provide access to network capabilities through homogenous network application programming interfaces (e.g. Network APIs). The exposure node may abstract the services from the underlying network interfaces and protocols.

In an embodiment, the exposure node comprises at least one of Service Capability Exposure Function (SCEF), Network Exposure Function (NEF), or SCEF combined with NEF.

The policy control node may be any suitable network device or node or entity or function (physical or virtual) which can provide policy control function. For example, the policy control node may support unified policy framework to govern network behavior. The policy control node may provide policy rules to control plane function(s) to enforce them. The policy control node may access subscription information relevant for policy decisions in a data repository.

In an embodiment, the policy control node may comprise at least one of Policy Control Function (PCF) or Policy and Charging Rules Function (PCRF).

At block 202, the network node may receive a first request for setting up a session with required quality of service (QOS) from an application node.

The application node may be a physical entity or a virtualized network function. For example, the application node may be any suitable network device or node or entity or function (physical or virtual) which can interacts with the network (such as 3GPP Core Network) in order to provide services. For example, the application node may support application influence on traffic routing. The application node may support accessing Network Exposure Function. The application node may support interacting with the Policy framework for policy control. Based on operator deployment, the application node considered to be trusted by the operator can be allowed to interact directly with relevant network functions. The application node not allowed by the operator to access directly the network functions shall use the external exposure framework via an exposure node such as NEF/SCEF to interact with relevant network functions.

In an embodiment, the application node may comprise at least one of application function (AF), application server (AS), or services capability server (SCS).

The first request may be any suitable request. In an embodiment, the first request may be Nnef_AFsessionWith-QoS_Create request as described in clause 4.15.6.6 of 3GPP TS 23.502 V17.0.0. In another embodiment, the first request may be an On-demand QoS request message as described in Clause 5.11 of 3GPP TS 23.682 V17.0.0. In another embodiment, the first request may be received via a Rx interface and triggers a PCRF initiated IP-CAN (IP-Connectivity Access Network) Session Modification as described in clause 7.4.2 of 3GPP TS 23.203 V17.1.0, the disclosure of which is incorporated by reference herein in its entirety. In an embodiment, the first request is an HTTP POST request.

In an embodiment, the first request comprises information indicating at least one of checking whether subscription data of the session to be set up by the first request conflicts with subscription data of an existing session, application node subscription checking is requested, or potential conflict with an existing session. The information may take any suitable form such as an indication, or a bit, or a flag, etc. In an embodiment, the information may be an attribute name such as 'subCheckInd'. The data type of the attribute name may be Boolean or other suitable data type. The attribute name indicates that the SCS/AF/AS session subscription checking is requested if the attribute name is included and set to true.

In an embodiment, the first request comprises information indicating a support of session subscription check. The information may take any suitable form such as an indication, or a bit, or a flag, etc. In an embodiment, the information may be an feature such as 'SubscriptionCheck'. This feature indicates the support of SCS/AF/AS session subscription check. In other embodiment, the feature of support of session subscription check may be included in any other suitable message. In this embodiment, the network node may know whether the application node support session restoration.

In an embodiment, the first request is received from the application node after the application node is restarted or reloaded.

At block 206, the network node may send a first response comprising error information and subscription information of the existing session including a subscription identifier to the application node.

In an embodiment, the network node may send the first response comprising error information and subscription information of the existing session including a subscription identifier to the application node when the subscription data of the session to be set up by the first request conflicts with the subscription data of the existing session.

The first response may be any suitable response. In an embodiment, the first request may be Nnef_AFsessionWith-QoS_Create response as described in clause 4.15.6.6 of 3GPP TS 23.502 V17.0.0. In another embodiment, the first request may be an On-demand QoS response message as described in Clause 5.11 of 3GPP TS 23.682 V17.0.0. In another embodiment, the first response may be sent via a Rx interface as described in clause 7.4.2 of 3GPP TS 23.203 V17.1.0.

In an embodiment, the first response is an HTTP POST response.

In an embodiment, the first response comprises information indicating a support of session subscription check. The information may take any suitable form such as an indication, or a bit, or a flag, etc. In an embodiment, the information may be an feature such as 'SubscriptionCheck'. This feature indicates the support of SCS/AF/AS session subscription check. In other embodiment, the feature of support of session subscription check may be included in any other suitable message. In this embodiment, the application node may know whether the network node support session subscription check.

In an embodiment, the error information comprises error status code and/or other error information. The error status code may be any suitable error status code. The error status code may indicate that the subscription request (i.e., the first request) was not processed upon conflicting with the existing QoS session subscription or other client errors e.g. syntax errors. In an embodiment, the error status code may be Hypertext Transfer Protocol (HTTP) 409 Conflict status code. In an embodiment, the error status code may be HTTP 400 Bad Request status code. In an embodiment, the error status code may be HTTP 303 See Other status code. In other embodiments, the error status code may be any other suitable HTTP status code.

In an embodiment, the subscription information of the existing session comprises a link to a resource "Individual Application Session with Required QoS Subscription" containing an existing subscription identifier. For example, if the subscription data of the session to be set up by the first request conflicts with the existing QoS session subscription, the network node shall return the existing subscription data and contain "self" attribute with the link to the resource "Individual AS Session with Required QoS Subscription" contains the existing subscription Id. The "self" attribute may be same as the "self" attribute as described in Table 5.14.2.1.2-1 of 3GPP TS 29.122 V17.2.0.

In an embodiment, the subscription information of the existing session further comprises existing subscription data of the existing session.

In an embodiment, the first response further comprises at least one of at least one QoS flow status of the existing session or at least one notification event of the existing session.

In an embodiment, a QoS flow status comprises at least one of active or inactive.

FIG. 2b shows a flowchart of a method according to another embodiment of the present disclosure, which may be performed by an apparatus implemented in or at or as a network node or communicatively coupled to the network node. As such, the apparatus may provide means or modules for accomplishing various parts of the method 220 as well as means or modules for accomplishing other processes in conjunction with other components. For some parts which have been described in the above embodiments, the description thereof is omitted here for brevity.

At block 202, the network node may receive a first request for setting up a session with required quality of service (QOS) from an application node. Block 202 is same as block 202 of FIG. 2a.

At block 204, the network node may determine (or check) whether subscription data of the session to be set up by the first request conflicts with subscription data of an existing session. For example, when the session to be set up by the first request conflicts with an existing session (e.g., partial or complete same subscription data), the network node may determine that the subscription data of the session to be set up by the first request conflicts with subscription data of an existing session. The network node may perform the determining operation unconditionally or conditionally. In an embodiment, the determining (or checking) operation is performed when the first request comprises information indicating at least one of checking whether subscription data of the session to be set up by the first request conflicts with subscription data of an existing session, application node subscription checking is requested, or potential conflict with an existing session.

At block 206, the network node may send a first response comprising error information and subscription information of the existing session including a subscription identifier to the application node. Block 206 is same as block 206 of FIG. 2a.

According to various embodiments, the proposed solution makes the application node such as AF/AS aware of a conflict between the subscription data of the session to be set up by the first request and the subscription data of an existing session by introducing a new feature negotiated between the application node and the network node. Depending on the first request including an indication about potential conflict with an existing session or other similar information, the network node such as NEF behaves in a specific manner. For example, the network node such as NEF shall check whether the requested subscription is conflict with one of the existing QoS session subscription data in the network node, if yes then the network node shall reject the new subscription request and return a new conflict error to the application node which includes the existing QoS session subscription data created/updated by the application node.

FIG. 3 shows a flowchart of a method according to another embodiment of the present disclosure, which may be performed by an apparatus implemented in or at or as a network node or communicatively coupled to the network node. As such, the apparatus may provide means or modules for accomplishing various parts of the method 300 as well as means or modules for accomplishing other processes in conjunction with other components. For some parts which have been described in the above embodiments, the description thereof is omitted here for brevity.

At block 302, the network node may store the at least one QoS flow status of the existing session and/or the at least one notification event of the existing session. The network node may store the at least one QoS flow status of the existing session and/or the at least one notification event of the existing session unconditionally or conditionally.

In an embodiment, the network node may store the at least one QoS flow status of the existing session and/or the at least one notification event of the existing session when the application node supports session subscription check or QoS session restoration. For example, the application node may send a message comprising information indicating that it supports session subscription check or QoS session restoration to the network node, and then the network node may know that the application node supports session subscription check or QoS session restoration.

The network node may keep track of QoS flow status (such as the deactivated QoS flows) and/or notified event report(s) of the existing QoS session. When the network node informs the application node about the conflict, the network node may also send at least one QoS flow status of the existing session and/or at least one notification event of the existing session. For example, the network node may send information about which flow(s) is active/inactive and/or which event(s) of which flow(s) with has been reported for the existing QoS session. In this way, the application node has the full information to internally rebuilt the QoS session: QoS session data requested and current QoS being applied.

FIG. 4 shows a flowchart of a method according to another embodiment of the present disclosure, which may be performed by an apparatus implemented in or at or as a network node or communicatively coupled to the network node. As such, the apparatus may provide means or modules for accomplishing various parts of the method 400 as well as means or modules for accomplishing other processes in conjunction with other components. For some parts which have been described in the above embodiments, the description thereof is omitted here for brevity.

At block 402, the network node may receive a second request for retrieving subscription data for the application node from the application node. The second request comprises identification information of one or more user equipments (UEs). The second request may be a HTTP GET request as described in clause 5.14.3.2.3.1 of 3GPP TS 29.122 V17.2.0 except that it further comprises identification information of one or more UEs.

The identification information of one or more UEs may be any suitable information which can be used to identify the one or more UEs. For example identification information of a UE may be an identifier or a UE address (such as IP address or MAC (Media Access Control) address).

In an embodiment, identification information of a UE comprises at least one of an Internet protocol (IP) version 4 (IPv4) address of the UE, an Internet protocol domain, an identifier of the UE, a MAC address of the UE, or an Internet protocol version 6 address of the UE. The identifier of the UE may be any suitable identifier which can uniquely identify the UE in the network. For example, the identifier of the UE may be an internal identifier used inside the network or an external identifier used outside the network. For example, the Internet protocol domain may be IPv4 address domain identifier. The Internet protocol domain may only be provided if IPv4 address is included in the ip-addrs query parameter.

At block 404, the network node may send a second response comprising one or more subscription data created by the application node corresponding to the identification information of one or more UEs to the application node.

In an embodiment, the second response further comprises at least one of at least one QoS flow status corresponding to the subscription data or at least one notification event corresponding to the subscription data.

In an embodiment, the second request is an HTTP GET request and the second response is an HTTP GET response.

In an embodiment, the second request is triggered for recovery. For example, the application node may trigger the request related with the recovery. In an embodiment, the second request is received from the application node after the application node is restarted or reloaded.

In an embodiment, the second response comprises queried active subscriptions for the application node. For example, the second response comprises one or more subscription data created by the application node corresponding to the identification information of one or more UEs to the application node or queried active subscriptions for a given SCS/AS.

According to various embodiments, the proposed solution provides a choice to an application node such as AF to proactively retrieve the QoS session subscription data with the subscription Id (identifier) from all the ongoing QoS sessions. In this way, only the QoS session subscription data related to identification information of one or more UEs is sent to the application node. The application node may send the second message before attempting the IP flow or application flow.

FIG. 5 shows a flowchart of a method according to another embodiment of the present disclosure, which may be performed by an apparatus implemented in or at or as an application node or communicatively coupled to the application node. As such, the apparatus may provide means or modules for accomplishing various parts of the method 500 as well as means or modules for accomplishing other processes in conjunction with other components. For some parts which have been described in the above embodiments, the description thereof is omitted here for brevity.

At block 502, the application node may send a first request for setting up a session with required quality of service (QOS) to an exposure function node. The first request is same as the one described in above embodiments.

At block 504, the application node may receive a first response comprising error information and subscription information of an existing session including a subscription identifier from the exposure function node. In an embodiment, the application node may receive the first response when subscription data of the session to be set up by the first request conflicts with the subscription data of the existing session. The first response is same as the one described in above embodiments.

After receiving the first response, the application node may know the error information and restore subscription data based on the received subscription information of the existing session including the subscription identifier.

FIG. 6 shows a flowchart of a method according to another embodiment of the present disclosure, which may be performed by an apparatus implemented in or at or as an application node or communicatively coupled to the application node. As such, the apparatus may provide means or modules for accomplishing various parts of the method 600 as well as means or modules for accomplishing other processes in conjunction with other components. For some parts which have been described in the above embodiments, the description thereof is omitted here for brevity.

At block 602, the application node may send a second request for retrieving subscription data for the application node to a network node. The second request comprises identification information of one or more user equipments (UEs). The second request is same as the one described in above embodiments.

At block 604, the application node may receive a second response comprising one or more subscription data created by the application node corresponding to the identification information of one or more UEs from the network node. The second response is same as the one described in above embodiments.

Figure 7:
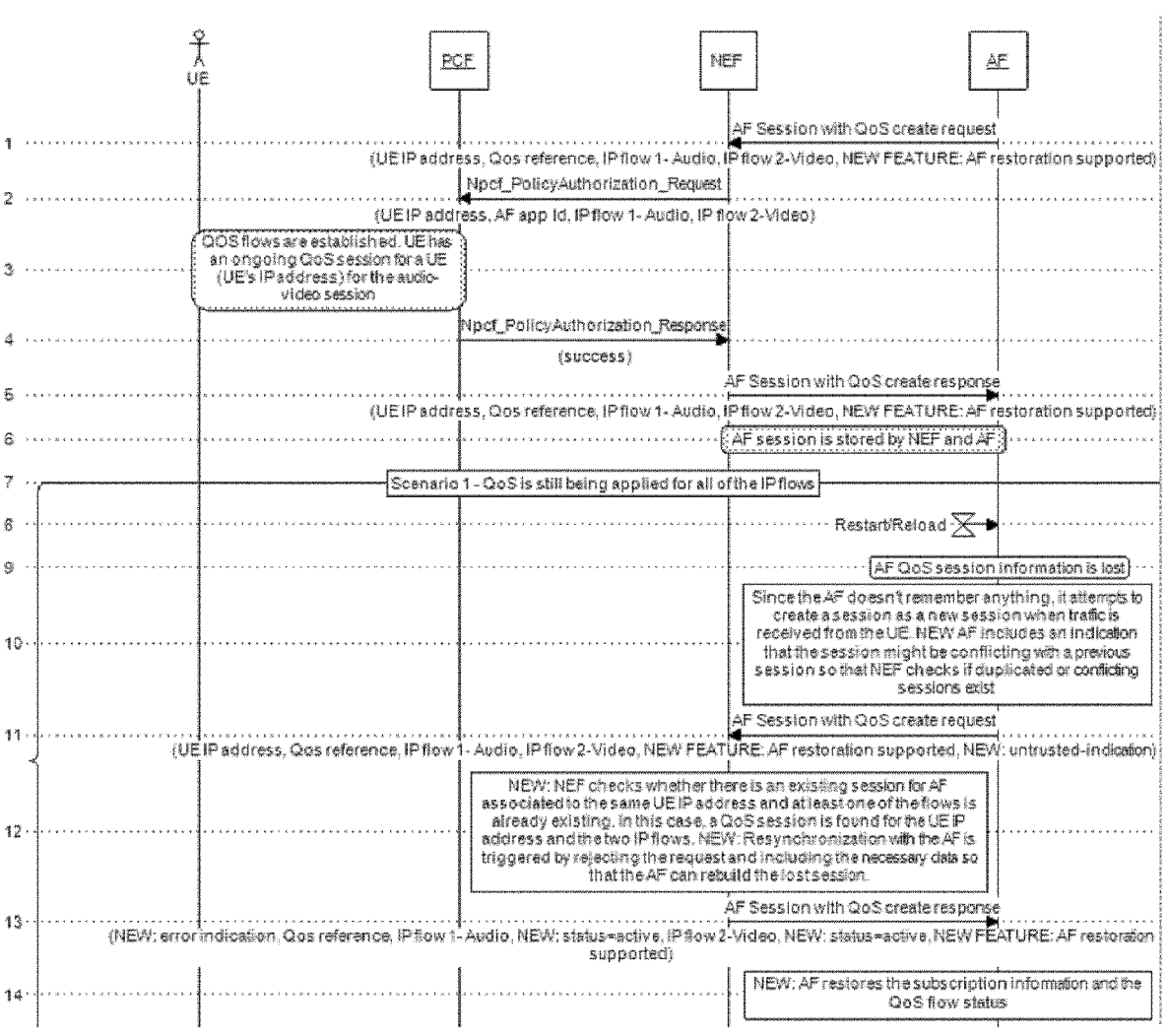
FIG. 7 shows a flowchart of AF QoS session restoration according to an embodiment of the present disclosure.

FIG. 7 shows a flowchart of AF QoS session restoration according to an embodiment of the present disclosure.

At step 1, AF sends AF Session with QoS create request (e.g., the first request) to NEF. The request may comprise UE IP address, QoS reference, IP flow 1—Audio, IP flow 2—Video, NEW FEATURE: AF restoration supported. In an embodiment, the AF restoration supported may be information indicating a support of session subscription check or subCheckInd as described above.

At step 2, NEF sends Npcf_PolicyAuthorization_Request to PCF. The Npcf_PolicyAuthorization_Request may comprise UE IP address, AF app Id, IP flow 1—Audio, IP flow 2—Video.

At step 3, QoS flows are established. UE has an ongoing QoS session for a UE (UE's IP address) for the audio-video session.

At step 4, PCF sends Npcf_PolicyAuthorization_Response (success) to NEF.

At step 5, NEF sends AF Session with QoS create response (e.g., the first response) to AF. The AF Session with QoS create response may comprise UE IP address, QoS reference, IP flow 1—Audio, IP flow 2—Video, NEW FEATURE: AF restoration supported. In an embodiment, the AF restoration supported may be information indicating a support of session subscription check or subCheckInd as described above.

At step 6, AF session (e.g., subscription data of the AF session) is stored by NEF and AF.

Steps 8-14 are for scenario 1: QOS is still being applied for all of the IP flows.

At step 8, AF is restarted or reloaded due to various reasons.

At step 9, AF QOS session information is lost.

At step 10, since the AF does not remember anything, it attempts to create a session as a new session when traffic is received from the UE. AF includes an indication that the session might be conflicting with a previous session so that NEF checks if duplicated or conflicting session exist. For example, when AF receives the traffic from UE, AF may request a new AS session with QoS subscription request, including an indication to NEF to check whether the subscription request is conflicting with existing QoS session subscription in NEF.

At step 11, AF sends a AF Session with QoS create request (e.g., the first request) to NEF. The request may comprise UE IP address, QoS reference, IP flow 1—Audio, IP flow 2-Video, NEW FEATURE: AF restoration supported, NEW: untrusted-indication (or AF-failure-indication or subscription check indication or session check indication, subscription and session check or other suitable indication). In an embodiment, the untrusted-indication may be information indicating at least one of: checking whether subscription data of the session to be set up by the first request conflicts with subscription data of an existing session, application node subscription checking is requested, or potential conflict with an existing session as described above.

At step 12, NEF checks whether there is an existing session for AF associated to the same UE IP address and at least one of the flows is already existing. In this case, a QoS session is found for the UE IP address and the two IP flows. Resynchronization with the AF is triggered by rejecting the request and including the necessary data so that the AF can rebuild the lost session.

At step 13, NEF sends AF Session with QoS create response to AF. The AF Session with QoS create response may comprise NEW: error indication, QoS reference, IP flow 1-Audio, NEW: status=active, IP flow 2—Video, NEW: status=active, NEW FEATURE: AF restoration supported.

At step 14, AF restores the subscription information and the QoS flow status.

Figure 8:
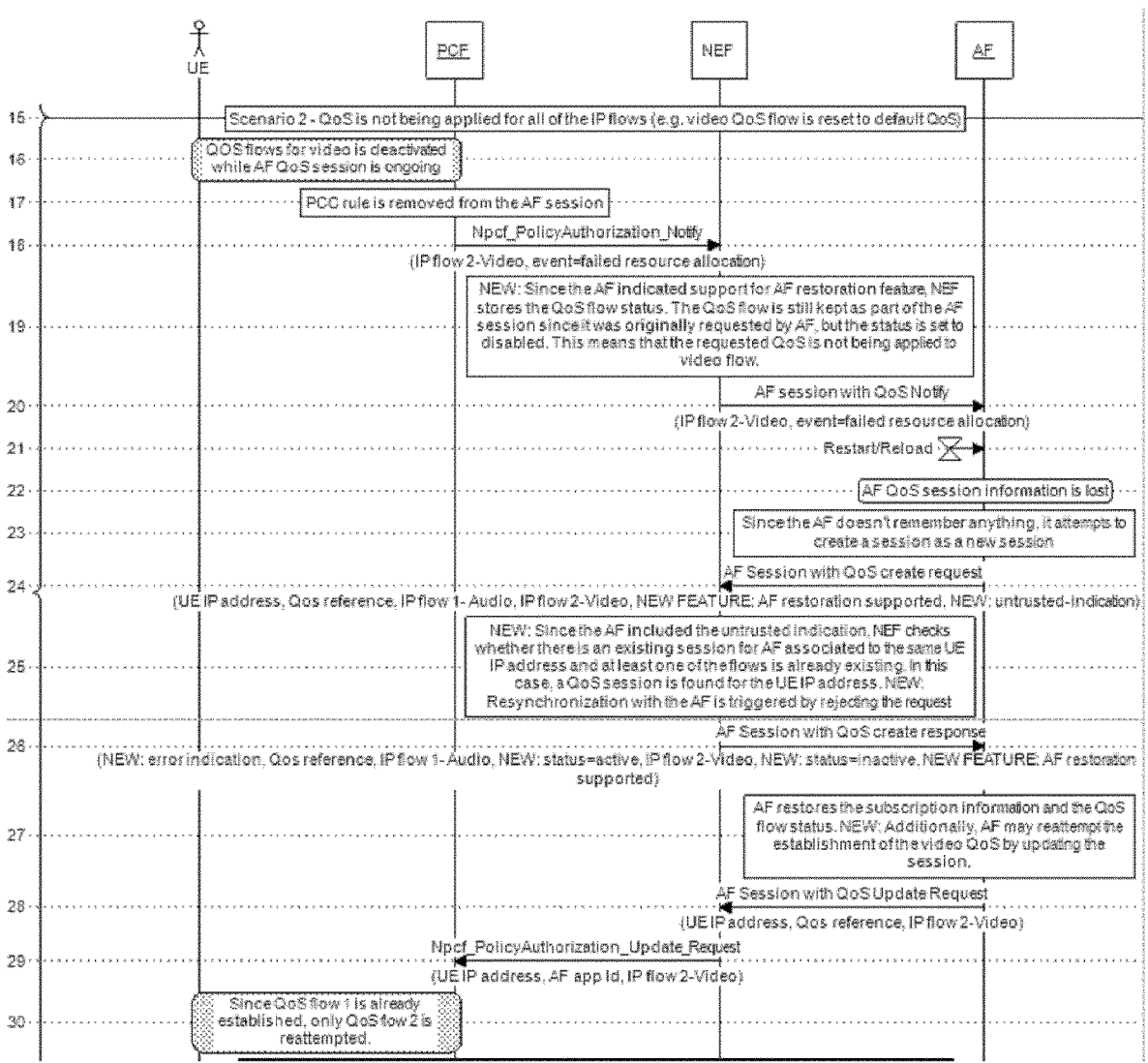
FIG. 8 shows a flowchart of AF QOS session restoration according to another embodiment of the present disclosure.

FIG. 8 shows a flowchart of AF QoS session restoration according to another embodiment of the present disclosure. In this embodiment, QoS is not being applied for all of the IP flows (e.g. video QoS flow is reset to default QoS). FIG. 8 may also include the steps 1-6 of FIG. 7.

At step 16, QoS flows for video is deactivated while AF QoS session is ongoing.

At step 17, PCC rule is removed from the AF session.

At step 18, PCF sends Npcf_PolicyAuthorization_Notify to NEF. The Npcf_PolicyAuthorization_Notify may comprise IP flow 2—Video, event=failed resource allocation.

At step 19, Since the AF indicated support for AF restoration feature, NEF stores the QoS flow status. The QoS flow is still kept as part of the AF session since it was originally requested by AF, but the status is set to disabled. This means that the requested QoS is not being applied to video flow.

At step 20, NEF sends AF session with QoS Notify to AF. The AF session with QoS Notify may comprise IP flow 2—Video, event=failed resource allocation.

At step 21, AF is restarted or reloaded due to various reasons.

At step 22, AF QOS session information is lost.

At step 23, since the AF does not remember anything, it attempts to create a session as a new session for example when traffic is received from the UE. AF includes an indication that the session might be conflicting with a previous session so that NEF checks if duplicated or conflicting session exist. For example, when AF receives the traffic from UE, AF may request a new AS session with QoS subscription request, including an indication to NEF to check whether the subscription request is conflicting with existing QoS session subscription in NEF.

At step 24, AF sends a AF Session with QoS create request (e.g., the first request) to NEF. The request may comprise UE IP address, QoS reference, IP flow 1—Audio, IP flow 2-Video, NEW FEATURE: AF restoration supported, NEW: untrusted-indication. In an embodiment, the untrusted-indication may be information indicating at least one of: checking whether subscription data of the session to be set up by the first request conflicts with subscription data of an existing session, application node subscription checking is requested, or potential conflict with an existing session as described above.

At step 25, since the AF included the untrusted-indication, NEF checks whether there is an existing session for AF associated to the same UE IP address and at least one of the flows is already existing. In this case, a QoS session is found for the UE IP address. Resynchronization with the AF is triggered by rejecting the request.

At step 26, NEF sends AF Session with QoS create response to AF. The AF Session with QoS create response may comprise NEW: error indication, QoS reference, IP flow 1-Audio, NEW: status=active, IP flow 2—Video, NEW: status=inactive, NEW FEATURE: AF restoration supported.

At step 27, AF restores the subscription information and the QoS flow status. Additionally, AF may reattempt the establishment of the video QoS by updating the session.

At step 28, AF sends AS Session with QoS Update Request to NEF. The AS Session with QoS Update Request may comprise UE IP address, QoS reference, IP flow 2—Video.

At step 29, NEF may send Npcf_Policy Authorization_Update Request to PCF. The Npcf_PolicyAuthorization_Update Request may comprise UE IP address, AF app Id, IP flow 2-Video.

At step 30, since QoS flow 1 is already established, only QoS flow 2 is reattempted.

Figure 9:
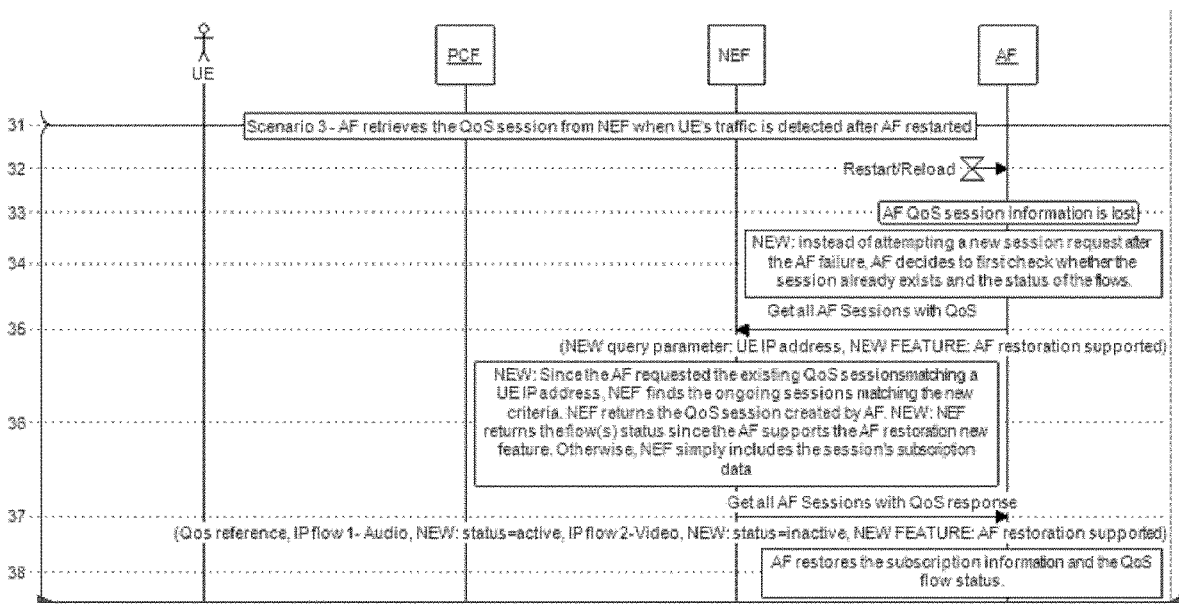
FIG. 9 shows a flowchart of AF QOS session restoration according to another embodiment of the present disclosure.

FIG. 9 shows a flowchart of AF QoS session restoration according to another embodiment of the present disclosure. In this embodiment, AF retrieves the QoS session from NEF when UE's traffic is detected after AF restarted or reloaded. FIG. 9 may also include the steps 1-6 of FIG. 7.

At step 32, AF is restarted or reloaded due to various reasons.

At step 33, AF QoS session information is lost.

At step 34, instead of attempting a new session request after the AF failure, AF decides to first check whether the session already exists and the status of the flows. For example, if the AF can get the UE ID(s) or UE address(es) upon or before the traffic from UE, AF may send GET query with UE ID(s) or UE address(es) to the NEF to retrieve the UE(s)' existing session with QoS subscription data. If NEF in GET response message return the UE's subscription data including the subscription Id, and the AF can recover the QoS session successfully, then the AF needn't send a new subscription request and the related procedure can be omitted.

At step 35, AF sends a GET all AF Session with QoS request (e.g., the second request) to NEF. The GET all AF Session with QoS request may comprise new query parameter: UE IP address, NEW FEATURE: AF restoration supported.

At step 36, since the AF requested the existing QoS session matching a UE IP address, NEF finds the ongoing session matching the new criteria. NEF returns the QoS session created by AF. NEF returns the flow(s) status since the AF supports the AF restoration new feature. Otherwise, NEF simply includes the session's subscription data.

At step 37, NEF sends a GET all AF Session with QoS response to AF. The GET all AF Session with QoS response may comprise QoS reference, IP flow 1—Audio, NEW: status=active, IP flow 2—Video, NEW: status=inactive, NEW FEATURE: AF restoration supported.

At step 38, AF restores the subscription information and the QoS flow status.

In this embodiment, GET method is enhanced by supporting GET query with UE ID(s) or UE Address(es) to minimize the signaling overload impacts comparing to GETALL.

Figure 10:
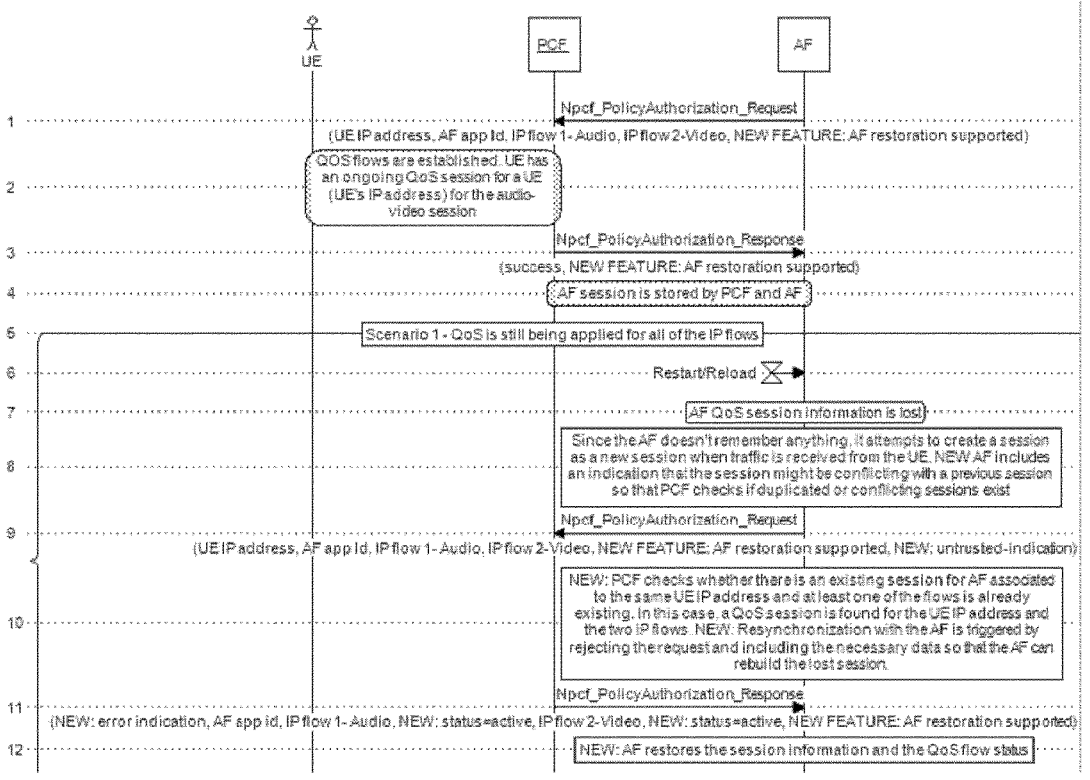
FIG. 10 shows a flowchart of AF QOS session restoration according to another embodiment of the present disclosure.

FIG. 10 shows a flowchart of AF QoS session restoration according to another embodiment of the present disclosure. In this embodiment, AF directly connects and interacts with PCF.

At step 1, AF sends Npcf_PolicyAuthorization_Request to PCF. The Npcf_PolicyAuthorization_Request may comprise UE IP address, AF app Id, IP flow 1—Audio, IP flow 2—Video, NEW FEATURE: AF restoration supported. In an embodiment, the AF restoration supported may be information indicating a support of session subscription check or subCheckInd as described above.

At step 2, QoS flows are established. UE has an ongoing QoS session for a UE (UE's IP address) for the audio-video session.

At step 3, PCF sends Npcf_PolicyAuthorization_Response (success, NEW FEATURE: AF restoration supported) to AF.

At step 4, AF session (e.g., subscription data of the AF session) is stored by PCF and AF.

Steps 6-12 are for scenario 1: QOS is still being applied for all of the IP flows.

At step 6, AF is restarted or reloaded due to various reasons.

At step 7, AF QoS session information is lost.

At step 8, since the AF does not remember anything, it attempts to create a session as a new session when traffic is received from the UE. AF includes an indication that the session might be conflicting with a previous session so that PCF checks if duplicated or conflicting session exist. For example, when AF receives the traffic from UE, AF may request a new AS session with QoS subscription request, including an indication to PCF to check whether the subscription request is conflict with existing QoS session subscription in PCF.

At step 9, AF sends Npcf_PolicyAuthorization_Request to PCF. The Npcf_PolicyAuthorization_Request may comprise UE IP address, AF app Id, IP flow 1—Audio, IP flow 2—Video, NEW FEATURE: AF restoration supported, NEW: untrusted-indication. In an embodiment, the untrusted-indication may be information indicating at least one of: checking whether subscription data of the session to be set up by the first request conflicts with subscription data of an existing session, application node subscription checking is requested, or potential conflict with an existing session as described above.

At step 11, PCF checks whether there is an existing session for AF associated to the same UE IP address and at least one of the flows is already existing. In this case, a QoS session is found for the UE IP address and the two IP flows. Resynchronization with the AF is triggered by rejecting the request and including the necessary data so that the AF can rebuild the lost session.

At step 11, PCF sends Npcf_PolicyAuthorization_Response (error indication, AF app Id, IP flow 1—Audio, NEW: status=active, IP flow 2—Video, NEW: status=active, NEW FEATURE: AF restoration supported.) to AF.

At step 12, AF restores the subscription information and the QoS flow status.

Figure 11:
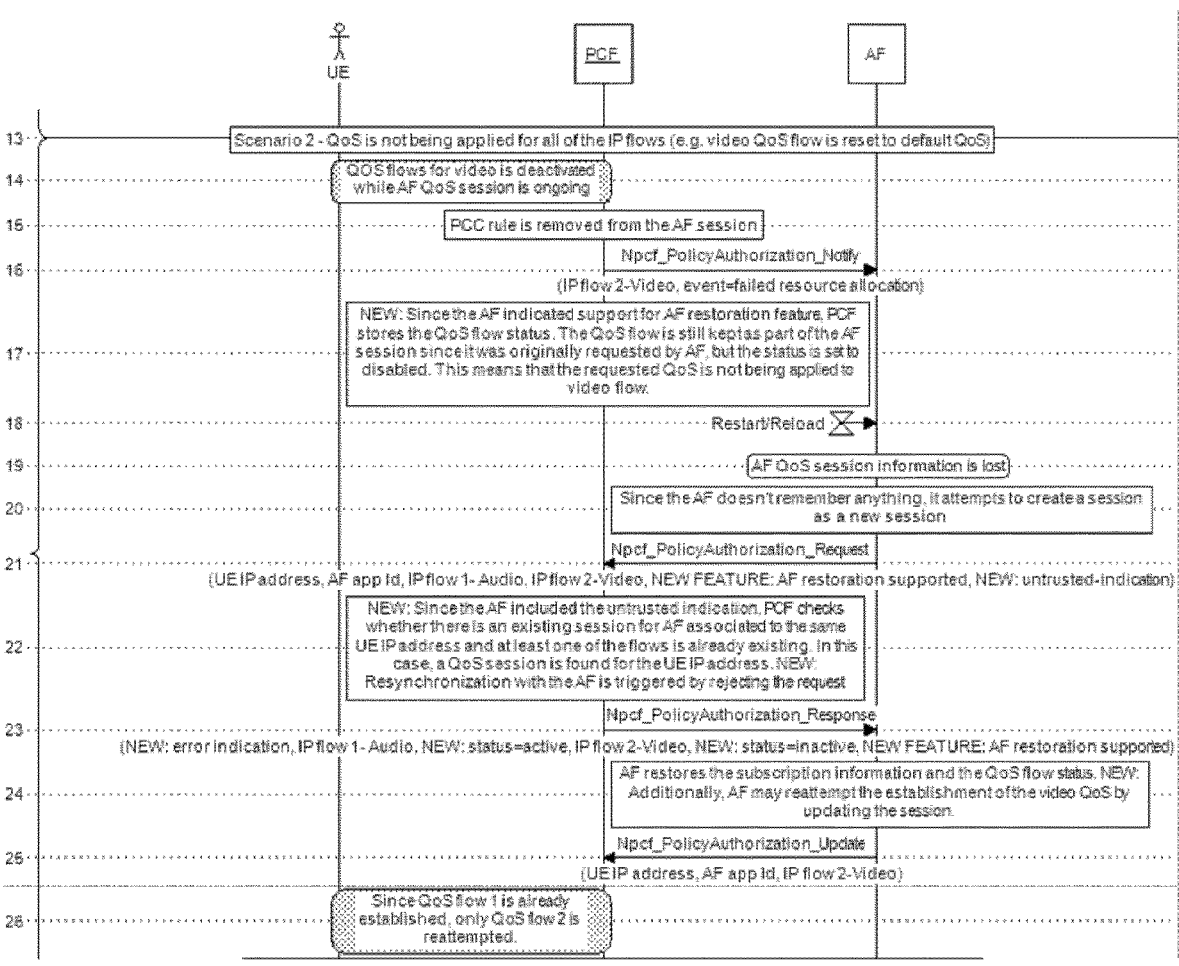
FIG. 11 shows a flowchart of AF QOS session restoration according to another embodiment of the present disclosure.

FIG. 11 shows a flowchart of AF QoS session restoration according to another embodiment of the present disclosure. In this embodiment, AF directly connects and interacts with PCF. In this embodiment, QoS is not being applied for all of the IP flows (e.g. video QoS flow is reset to default QoS). FIG. 11 may also include the steps 1-4 of FIG. 10.

At step 14, QoS flows for video is deactivated while AF QoS session is ongoing.

At step 15, PCC rule is removed from the AF session.

At step 16, PCF sends Npcf_PolicyAuthorization_Notify to AF. The Npcf_PolicyAuthorization_Notify may comprise IP flow 2—Video, event=failed resource allocation.

At step 17, Since the AF indicated support for AF restoration feature, PCF stores the QoS flow status. The QoS flow status is still kept as part of the AF session since it was originally requested by AF, but the status is set to disabled. This means that the requested QoS is not being applied to video flow.

At step 18, AF is restarted or reloaded due to various reasons.

At step 19, AF QOS session information is lost.

At step 20, since the AF does not remember anything, it attempts to create a session as a new session for example when traffic is received from the UE. AF includes an indication that the session might be conflicting with a previous session so that PCF checks if duplicated or conflicting session exist. For example, when AF receives the traffic from UE, AF may request a new AS session with QoS subscription request, including an indication to PCF to check whether the subscription request is conflicting with existing QoS session subscription in NEF.

At step 21, AF sends Npcf_PolicyAuthorization_Request to PCF. The Npcf_PolicyAuthorization_Request may comprise UE IP address, AF app Id, IP flow 1—Audio, IP flow 2—Video, NEW FEATURE: AF restoration supported, NEW: untrusted-indication. In an embodiment, the untrusted-indication may be information indicating at least one of: checking whether subscription data of the session to be set up by the first request conflicts with subscription data of an existing session, application node subscription checking is requested, or potential conflict with an existing session as described above.

At step 22, since the AF included the untrusted-indication, PCF checks whether there is an existing session for AF associated to the same UE IP address and at least one of the flows is already existing. In this case, a QoS session is found for the UE IP address. Resynchronization with the AF is triggered by rejecting the request.

At step 23, PCF sends Npcf_PolicyAuthorization_Response (error indication, IP flow 1—Audio, NEW: status=active, IP flow 2—Video, NEW: status=inactive, NEW FEATURE: AF restoration supported) to AF.

At step 24, AF restores the subscription information and the QoS flow status. Additionally, AF may reattempt the establishment of the video QoS by updating the session.

At step 25, AF sends Npcf_PolicyAuthorization_Update to PCF. The Npcf_PolicyAuthorization_Update may comprise UE IP address, AF app Id, IP flow 2—Video.

At step 26, since QoS flow 1 is already established, only QoS flow 2 is reattempted.

Figure 12:
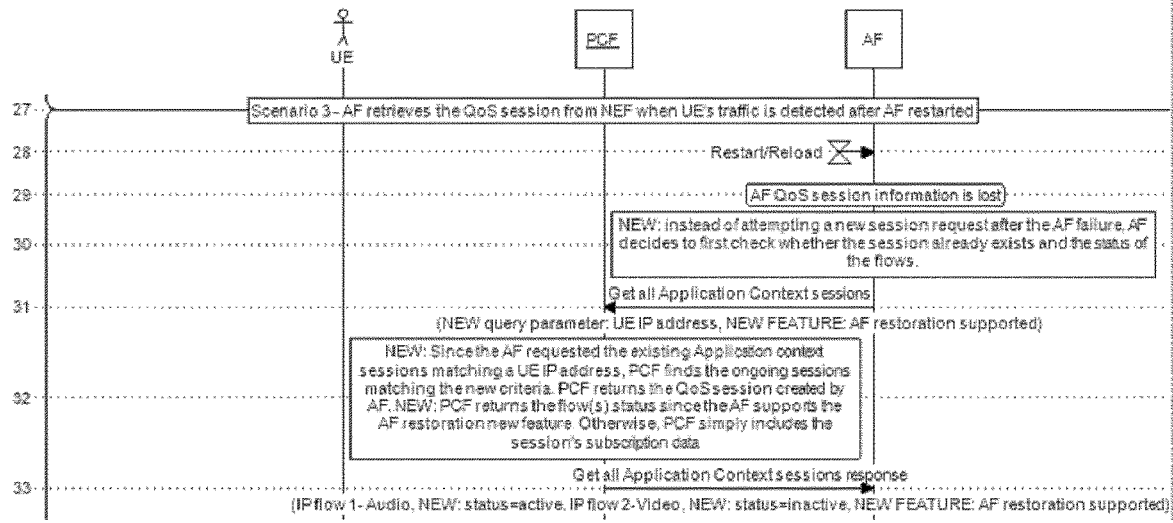
FIG. 12 shows a flowchart of AF QoS session restoration according to another embodiment of the present disclosure.

FIG. 12 shows a flowchart of AF QoS session restoration according to another embodiment of the present disclosure. In this embodiment, AF directly connects and interacts with PCF. In this embodiment, AF retrieves the QoS session from PCF when UE's traffic is detected after AF restarted or reloaded. FIG. 12 may also include the steps 1-4 of FIG. 10.

At step 28, AF is restarted or reloaded due to various reasons.

At step 29, AF QOS session information is lost.

At step 30, instead of attempting a new session request after the AF failure, AF decides to first check whether the session already exists and the status of the flows. For example, if the AF can get the UE ID(s) or UE address(es) upon or before the traffic from UE, AF may send GET query with UE ID(s) or UE address(es) to the PCF to retrieve the UE(s)' existing session with QoS subscription data. If PCF in GET response message return the UE's subscription data including the subscription Id, and the AF can recover the QoS session successfully, then the AF needn't send a new subscription request and the related procedure can be omitted.

At step 31, AF sends a GET all Application Context Session request to PCF. The GET all Application Context Session request may comprise new query parameter: UE IP address, NEW FEATURE: AF restoration supported.

At step 32, since the AF requested the existing Application Context Session matching a UE IP address, PCF finds the ongoing session matching the new criteria. PCF returns the QoS session created by AF. PCF returns the flow(s) status since the AF supports the AF restoration new feature. Otherwise, PCF simply includes the session's subscription data.

At step 33, PCF sends a GET all Application Context Session response to AF. The GET all Application Context Session response may comprise IP flow 1—Audio, NEW: status=active, IP flow 2—Video, NEW: status=inactive, NEW FEATURE: AF restoration supported.

AF restores the subscription information and the QoS flow status.

In this embodiment, GET method is enhanced by supporting GET query with UE ID(s) or UE Address(es) to minimize the signaling overload impacts comparing to GETALL.

In an embodiment, it proposed Get query subscription to minimize signaling overload impacts. GET method to retrieve active session subscriptions per SCS/AS Id or AF Id, can be enhanced to support optional query UE address(es) to minimize the signaling load impacts, and meets the AF requirement If only needs to retrieve specific UE(s) QoS sessions subscription data without knowledge of each subscription Id, to avoid wast both NEF and AF processing cost for the not required subscription data.

In an embodiment, it proposed subscription check to avoid duplication and IoT issues. If the AF/AS establish new QoS sessions subscription request towards the NEF/SCEF upon AF/AS fast recovery and traffic from UE, solution to The reason to consider 400 Bad Request is upon RFC 7231 describes the 400 (Bad Request) status code has been relaxed so that it isn't limited to syntax errors, the server cannot or will not process the request due to something that is perceived to be a client error, which is suitable to avoid duplicate of AS session create with least impact to NEF/SCEF and AF/AS, also supporting extension in response body to return the existing QoS session(s)' subscriptions with each subscription Id and resource links.

In an embodiment, the following content may be added into clause 4.4.13 of 3GPP TS 29.122 V17.2.0.

For initial AS session creation, the SCS/AS shall send an HTTP POST message to the SCEF for the "AS Session with Required QoS Subscriptions" resource. The body of HTTP POST message shall include SCS/AS Identifier, UE IP address, IP Flow description, QoS reference and notification destination address. And it may also include time period and/or traffic volume for sponsored data connectivity purpose. If the feature AppId is supported, either the Flow description or an external Application Identifier shall be included. If the feature SubscriptionCheck is supported, the SCS/AS may include subCheckInd attribute to indicate the SCEF to check whether the AS session subscription request is conflict with an existing AS session subscription.

If the subCheckInd attribute is included in the HTTP POST message, the SCEF shall check whether the requested subscription data is included in the existing AS session(s)' subscription. If the conflict is identified, then the new subscription shall not be created. The SCEF shall respond to the SCS/AS with 400 error status code, the returned existing complete AS session(s) with QoS subscription data shall contain "self" attribute with the link to the resource "Individual AS Session with Required QoS Subscription" contains the existing subscription Id. If no conflict is identified, the SCEF shall continue to handle the following procedures in below descriptions.

In an embodiment, the following content may be added into Table 5.14.2.1.2-1 of 3GPP TS 29.122 V17.2.0.

| Attribute name | Data type | Cardinality | Description | Applicability (NOTE 1) |
|---|---|---|---|---|
| subCheckInd | boolean | 0 . . . 1 | Indicates that the AS session subscription checking is requested if it is included and set to true. | Subscription Check | enhance AF/AS and NEF/SCEF to support subscription check feature, indicator and procedure is proposed.

In an embodiment, AF/AS and NEF/SCEF support subscription check feature. When AF/AS has no knowledge on whether the new session subscription request is conflict with the existing session or missing the existing session subscription Id, AF/AS may send the subscription check indicator in the subscription request.

In an embodiment, NEF/SCEF upon receiving subscription check indicator in the subscription request from the AF/AS, shall check the new subscription request with the existing QoS sessions' subscription, once the conflict is identified, then NEF/SCEF shall not process the new session request, instead an error code (400 Bad Request is considered suitable) to be returned with the matched conflicted existing AS session(s)' subscription data (including the existing subscription Id) in the response message body, to support AF to effectively recover the corresponding AS session(s) with QoS.

In an embodiment, the following content may be added into Table 5.14.3.2.3.1-2 of 3GPP TS 29.122 V17.2.0.

| | Data type | Cardinality | Remarks |
|---|---|---|---|
| Request body | Ipv4Addr | 0 . . . N | The IPv4 address(es) of the requested UE(s). |
| | Ipv6Addr | 0 . . . N | The IPV6 address(es) of the requested UE(s). |

In an embodiment, the following content may be added into Table 5.14.3.2.3.4-2 of 3GPP TS 29.122 V17.2.0.

| Data type | | Cardinality | Remarks | |
|---|---|---|---|---|
| Request body | AsSessionWithQoSSubscription | 0 . . . N | 400 Bad Request | The subscription request was not processed upon conflicting with the existing QoS session subscription or other client errors eg. syntax errors. If conflicting with the existing QoS session subscription, shall reture the existing subscription data and contain "self" attribute with the link to the resource "Individual AS Session with Required QoS Subscription" contains the existing subscription Id. |

In an embodiment, the following content may be added into Table 5.14.4-1 of 3GPP TS 29.122 V17.2.0. m may be any suitable number such as 11.

| Feature Number | Feature | Description |
|---|---|---|
| m | SubscriptionCheck | This feature indicates the support of AS session subscription check. |

Embodiments herein may provide many advantages, of which a non-exhaustive list of examples follows. In some embodiments herein, the proposed solution can protect the core network from creating duplicated resources by means of network node (such as NEF/SCEF/PCF/PCRF) implementing the conflict detection and providing accurate information to application node (such as AF/AS/SCS) so that they can resolve the conflict based on needs/requirements, hence making subscription information between the application node and the network node consistent after an application node failure. In some embodiments herein, the proposed solution can allow an application node to quickly resync/retrieve its own QoS sessions when a failure/loss of data happened in the application node upon unexpected problems like restart or reload. In some embodiments herein, the proposed solution can avoid extra resources occupation in the network node (such as NEF, PCF, SMF and UPF). In some embodiments herein, the proposed solution can minimize the signaling messages between the application node and the network node. In some embodiments herein, the proposed solution can shorten the AF QoS session recovery time upon avoiding some new QoS session creation request messages. The embodiments herein are not limited to the features and advantages mentioned above. A person skilled in the art will recognize additional features and advantages upon reading the following detailed description.

Figure 13:
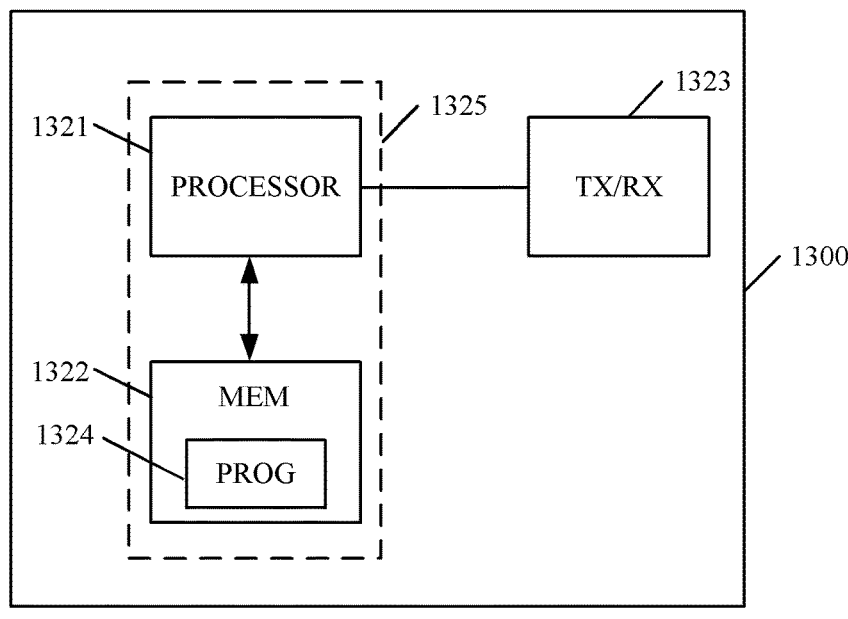
FIG. 13 is a block diagram showing an apparatus suitable for practicing some embodiments of the disclosure.

FIG. 13 is a block diagram showing an apparatus suitable for practicing some embodiments of the disclosure. For example, any one of the application node or the network node described above may be implemented as or through the apparatus 1300.

The apparatus 1300 comprises at least one processor 1321, such as a digital processor (DP), and at least one memory (MEM) 1322 coupled to the processor 1321. The apparatus 1300 may further comprise a transmitter TX and receiver RX 1323 coupled to the processor 1321. The MEM 1322 stores a program (PROG) 1324. The PROG 1324 may include instructions that, when executed on the associated processor 1321, enable the apparatus 1300 to operate in accordance with the embodiments of the present disclosure. A combination of the at least one processor 1321 and the at least one MEM 1322 may form processing means 1325 adapted to implement various embodiments of the present disclosure.

Various embodiments of the present disclosure may be implemented by computer program executable by one or more of the processor 1321, software, firmware, hardware or in a combination thereof.

The MEM 1322 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 1321 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the network node, the memory 1322 contains instructions executable by the processor 1321, whereby the network node operates according to any of the methods related to the network node as described above.

In an embodiment where the apparatus is implemented as or at the application node, the memory 1322 contains instructions executable by the processor 1321, whereby the application node operates according to any of the methods related to the application node as described above.

Figure 14:
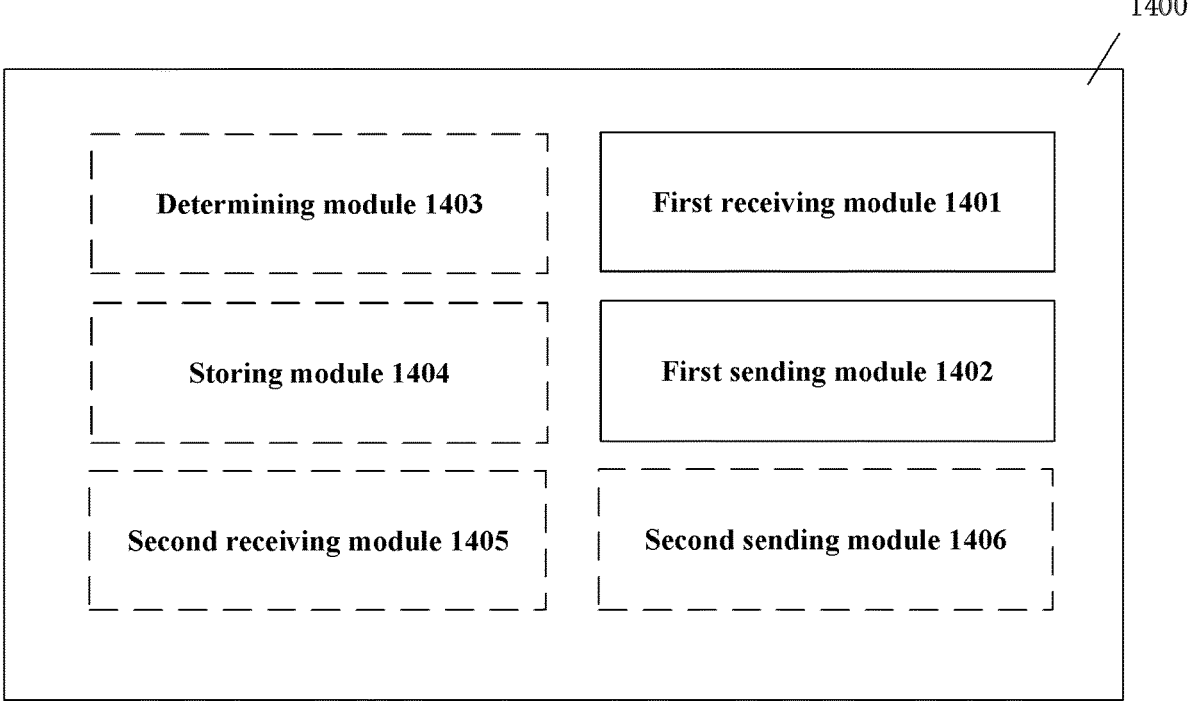
FIG. 14 is a block diagram showing a network node according to an embodiment of the disclosure.

FIG. 14 is a block diagram showing a network node according to an embodiment of the disclosure. As shown, the network node 1400 comprises a first receiving module 1401 and a first sending module 1402. The first receiving module 1401 may be configured to receive a first request for setting up a session with required quality of service (QOS) from an application node. The first sending module 1402 may be configured to send a first response comprising error information and subscription information of an existing session including a subscription identifier to the application node.

In an embodiment, the network node 1400 further comprises a determining module 1403 configured to determine whether subscription data of the session to be set up by the first request conflicts with subscription data of an existing session.

In an embodiment, the network node 1400 further comprises a storing module 1404 configured to store the at least one QoS flow status of the existing session and/or the at least one notification event of the existing session.

In an embodiment, the network node 1400 further comprises a second receiving module 1405 configured to receive a second request for retrieving subscription data for the application node from the application node, wherein the second request comprises identification information of one or more user equipments (UEs).

In an embodiment, the network node 1400 further comprises a second sending module 1406 configured to send a second response comprising one or more subscription data created by the application node corresponding to the identification information of one or more UEs to the application node.

Figure 15:
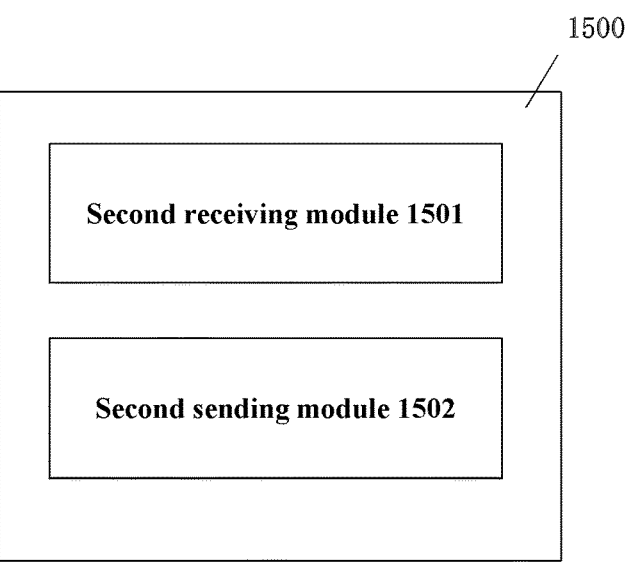
FIG. 15 is a block diagram showing a network node according to another embodiment of the disclosure.

FIG. 15 is a block diagram showing a network node according to another embodiment of the disclosure. As shown, the network node 1500 comprises a second receiving module 1501 and a second sending module 1502. The second receiving module 1501 is configured to receive a second request for retrieving subscription data for the application node from the application node, wherein the second request comprises identification information of one or more user equipments (UEs). The second sending module 1502 is configured to send a second response comprising one or more subscription data created by the application node corresponding to the identification information of one or more UEs to the application node.

Figure 16:
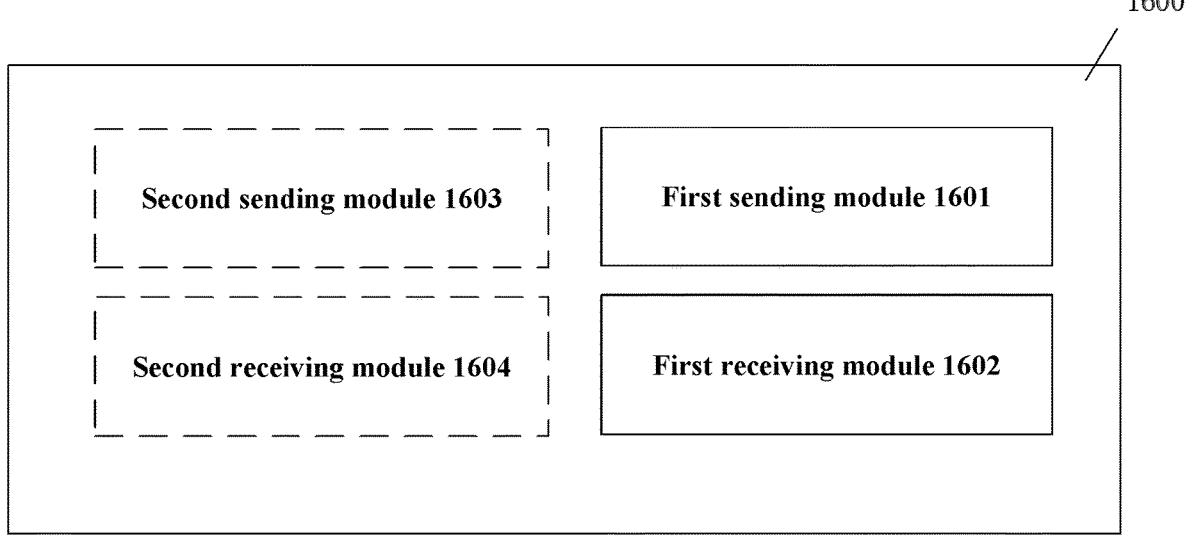
FIG. 16 is a block diagram showing an application node according to an embodiment of the disclosure.

FIG. 16 is a block diagram showing an application node according to an embodiment of the disclosure. As shown, the application node 1600 comprises a first sending module 1601 and a first receiving module 1602. The first sending module 1601 is configured to send a first request for setting up a session with required quality of service (QOS) to an exposure function node. The first receiving module 1602 is configured to receive a first response comprising error information and subscription information of an existing session including a subscription identifier from the exposure function node.

In an embodiment, the application node 1600 further comprises a second sending module 1603 configured to send a second request for retrieving subscription data for the application node to the network node. The second request comprises identification information of one or more user equipments (UEs).

In an embodiment, the application node 1600 further comprises a second receiving module 1604 configured to receive a second response comprising one or more subscription data created by the application node corresponding to the identification information of one or more UEs from the network node.

Figure 17:
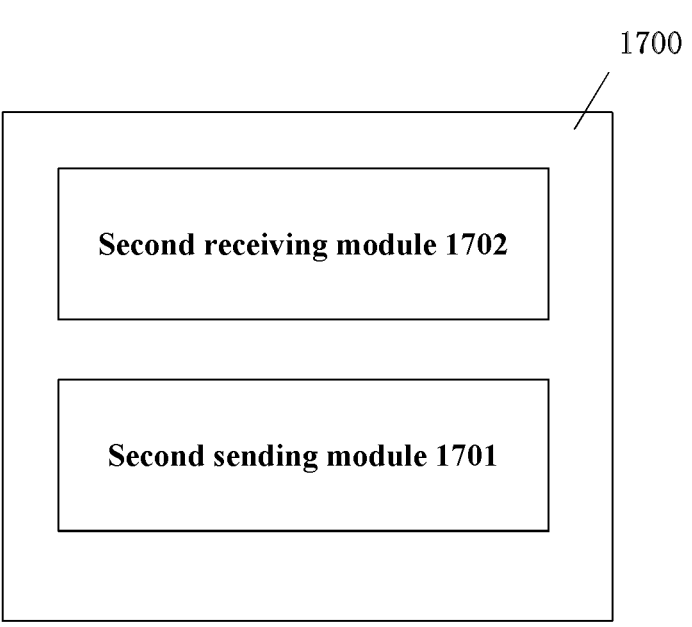
FIG. 17 is a block diagram showing an application node according to another embodiment of the disclosure.

FIG. 17 is a block diagram showing an application node according to another embodiment of the disclosure. As shown, the application node 1700 comprises a second sending module 1701 and a second receiving module 1702. The second sending module 1701 is configured to send a second request for retrieving subscription data for the application node to a network node, wherein the second request comprises identification information of one or more user equipments (UEs). The second receiving module 1702 is configured to receive a second response comprising one or more subscription data created by the application node corresponding to the identification information of one or more UEs from the network node.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the network node or the application node may not need a fixed processor or memory, any computing resource and storage resource may be arranged from the network node or the application node in the communication system. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a network exposure node, comprising:
  receiving from an application node a second request for retrieving subscription data for the application node, wherein the second request comprises identification information of one or more user equipments (UEs); and
  sending a second response comprising one or more subscription data created by the application node corresponding to the identification information of one or more UEs to the application node.

2. The method according to claim 1, wherein identification information of a UE comprises at least one of:
  an Internet protocol version 4 address of the UE,
  an Internet protocol domain,
  an identifier of the UE,
  a MAC address of the UE, or
  an Internet protocol version 6 address of the UE.

3. The method according to claim 1, wherein the second response further comprises at least one of:
  at least one QoS flow status corresponding to the subscription data, or
  at least one notification event corresponding to the subscription data.

4. The method according to claim 1, wherein the second request is an HTTP GET request and the second response is an HTTP GET response.

5. The method according to claim 1, wherein the network exposure node comprises at least one of:
  an exposure function node, or
  a policy control node.

6. The method according to claim 5, wherein the policy control node comprises at least one of:
  Policy Control Function (PCF), or
  Policy and Charging Rules Function (PCRF).

7. The method according to claim 5, wherein the exposure function node comprises at least one of:
  Service Capability Exposure Function (SCEF),
  Network Exposure Function (NEF), or
  SCEF combined with NEF.

8. The method according to claim 1, wherein the application node comprises at least one of:
  application function,
  application server (AS), or
  services capability server (SCS).

9. The method according to claim 1, wherein the second request is triggered for recovery; and/or wherein the second response comprises queried active subscriptions for the application node.

10. A method performed by an application node, comprising:
  sending a second request for retrieving subscription data for the application node to a network node, wherein the second request comprises identification information of one or more user equipments (UEs); and
  receiving a second response comprising one or more subscription data created by the application node corresponding to the identification information of one or more UEs from the network node.

11. The method according to claim 10, wherein identification information of a UE comprises at least one of:
  an Internet protocol version 4 address of the UE,
  an Internet protocol domain,
  an identifier of the UE,
  a MAC address of the UE, or
  an Internet protocol version 6 address of the UE.

12. The method according to claim 10, wherein the second response further comprises at least one of:
  at least one QoS flow status corresponding to the subscription data, or
  at least one notification event corresponding to the subscription data.

13. The method according to claim 10, wherein the second request is an HTTP GET request and the second response is an HTTP GET response.

14. The method according to claim 10, wherein the network node comprises at least one of:
  an exposure function node, or
  a policy control node.

15. The method according to claim 14, wherein the policy control node comprises at least one of:
  Policy Control Function (PCF), or
  Policy and Charging Rules Function (PCRF).

16. The method according to claim 14, wherein the exposure function node comprises at least one of:
  Service Capability Exposure Function (SCEF),
  Network Exposure Function (NEF), or
  SCEF combined with NEF.

17. The method according to claim 10, wherein the application node comprises at least one of:
  application function,
  application server, or
  services capability server.

18. The method according to claim 10, wherein the second request is triggered for recovery; and/or wherein the second response comprises queried active subscriptions for the application node.

19. A network exposure node, comprising:

a processor; and a memory coupled to the processor, said memory containing instructions executable by said processor, whereby said network exposure node is operative to:

receive from an application node a second request for retrieving subscription data for the application node, wherein the second request comprises identification information of one or more user equipments (UEs); and send a second response comprising one or more subscription data created by the application node corresponding to the identification information of one or more UEs to the application node.

20. An application node, comprising:

a processor; and a memory coupled to the processor, said memory containing instructions executable by said processor, whereby said application node is operative to:

send a second request for retrieving subscription data for the application node to a network node, wherein the second request comprises identification information of one or more user equipments (UEs); and receive a second response comprising one or more subscription data created by the application node corresponding to the identification information of one or more UEs from the network node.

\*    \*    \*    \*    \*